United States Patent
Kim et al.

(10) Patent No.: US 11,073,863 B2
(45) Date of Patent: Jul. 27, 2021

(54) FOLDABLE DISPLAY DEVICE

(71) Applicant: SAMSUNG DISPLAY CO., LTD., Yongin-si (KR)

(72) Inventors: Se Yong Kim, Asan-si (KR); In Soo Park, Hwaseong-si (KR); Jin Yong Sim, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/837,033

(22) Filed: Apr. 1, 2020

(65) Prior Publication Data
US 2021/0026406 A1      Jan. 28, 2021

(30) Foreign Application Priority Data

Jul. 23, 2019    (KR) .................. 10-2019-0089054

(51) Int. Cl.
*G06F 1/16* (2006.01)
(52) U.S. Cl.
CPC .......... *G06F 1/1616* (2013.01); *G06F 1/1656* (2013.01); *G06F 1/1681* (2013.01)
(58) Field of Classification Search
CPC .... G06F 1/1641; G06F 1/1652; G06F 1/1656; H04M 1/0268
See application file for complete search history.

(56) References Cited

U.S. PATENT DOCUMENTS

| | | | |
|---|---|---|---|
| 9,348,450 B1 * | 5/2016 | Kim ...................... | G06F 1/1681 |
| 10,551,880 B1 * | 2/2020 | Ai ........................ | H04M 1/0216 |
| 2002/0104769 A1 * | 8/2002 | Kim ...................... | G06F 1/1637 |
| | | | 206/320 |
| 2012/0236484 A1 | 9/2012 | Miyake | |
| 2013/0002114 A1 * | 1/2013 | Hamers ................ | G06F 1/1679 |
| | | | 312/319.5 |

(Continued)

FOREIGN PATENT DOCUMENTS

| | | |
|---|---|---|
| CN | 109488681 | 3/2019 |
| EP | 1939470 | 7/2008 |

(Continued)

OTHER PUBLICATIONS

European Search Report dated Nov. 24, 2020 in corresponding European Application No. 20186972.4 (5 pages).

*Primary Examiner* — Anthony Q Edwards
(74) *Attorney, Agent, or Firm* — F. Chau & Associates, LLC

(57) ABSTRACT

A foldable display device is described. The foldable display device comprises: a first support member and a second support member, which are separated from each other, a display module disposed on the first support member and the second support member, a hinge coupling one side of the first support member and one side of the second support member, a hinge cover surrounding the hinge and comprising a dust cap on an upper edge thereof, a first back cover disposed under the first support member and comprising a first protrusion at one end thereof, and a second back cover disposed under the second support member and comprising a second protrusion at one end thereof, the dust cap is in contact with the first protrusion and the second protrusion when the display module is folded.

23 Claims, 22 Drawing Sheets

(56) References Cited

U.S. PATENT DOCUMENTS

| | | | | |
|---|---|---|---|---|
| 2014/0111954 A1* | 4/2014 | Lee | ............... | G06F 1/1652 |
| | | | | 361/749 |
| 2015/0233162 A1* | 8/2015 | Lee | ............... | G06F 1/1626 |
| | | | | 16/223 |
| 2016/0070306 A1* | 3/2016 | Shin | ............... | G06F 1/1626 |
| | | | | 361/679.27 |
| 2016/0097227 A1* | 4/2016 | Hsu | ............ | F16B 1/00 |
| | | | | 16/354 |
| 2019/0166703 A1* | 5/2019 | Kim | ............... | G06F 1/1679 |
| 2019/0390703 A1 | 12/2019 | Hsu | | |
| 2020/0137907 A1* | 4/2020 | Kang | ............... | H05K 5/0226 |
| 2021/0034117 A1* | 2/2021 | Torres | ............... | E05D 3/06 |

FOREIGN PATENT DOCUMENTS

| | | |
|---|---|---|
| EP | 3264732 | 1/2018 |
| EP | 3489795 | 5/2019 |
| KR | 10-2015-0096946 | 8/2015 |
| KR | 10-2015-0130652 | 11/2015 |
| KR | 10-2016-0083608 | 7/2016 |
| KR | 10-2017-0033626 | 3/2017 |

\* cited by examiner

FOLDABLE DISPLAY DEVICE

This application claims priority from Korean Patent Application No. 10-2019-0089054 filed on Jul. 23, 2019, in the Korean Intellectual Property Office, the disclosure of which is incorporated by reference herein.

1. TECHNICAL FIELD

The present disclosure relates generally to a foldable display device.

2. DISCUSSION OF RELATED ART

A display device is a device used for displaying an image. A display device may include one or more display panels. Display panels can be organic light-emitting diode (OLED) panels, quantum dot electroluminescent (QD-EL) devices, or liquid crystal display (LCD) panels. Mobile electronic devices, such as tablet computers and mobile phones, may include one or more display devices for displaying images.

The size of some mobile electronic devices is increasing as development is focused on larger displays. But while the display device may be larger, the thickness of electronic devices has become smaller. Display devices that can be folded provide increased portability even when displays are made larger.

When a foldable display device is folded, a small gap exists between the hinged area and the cover area, allowing foreign matters to fall into the display device. This can lead to defects or damage to the display device.

SUMMARY

Aspects of the present invention are to provide a foldable display device that can reduce a gap between a cover case and a hinge case using protrusions included in each of the cover case and the hinge case.

However, aspects of the present invention are not restricted to the one set forth herein. The above and other aspects of the present invention will become more apparent to one of ordinary skill in the art to which the present invention pertains by referencing the detailed description of the present invention given below.

According to one or more embodiments of the invention, a foldable display device may include a first support member and a second support member, which are separated from each other in a first direction; a display module disposed on the first support member and the second support member; a hinge extending in a second direction perpendicular to the first direction, and coupling one side of the first support member and one side of the second support member; a hinge cover surrounding the hinge on at least one side, wherein the hinge is disposed between the display module and the hinge cover in a third direction perpendicular to the first direction and the second direction; one or more dust caps disposed on at least one edge of the hinge cover; a first back cover disposed on the first support member in the third direction, wherein an edge of the first back cover extending parallel to the one side of the first support member in the second direction is separated from the first support member in the third direction, and wherein a first portion of the hinge and a first portion of the hinge cover are disposed between the first back cover and the display module when the display module is unfolded; a second back cover disposed on the second support member in the third direction, wherein an edge of the second back cover extending parallel to the one side of the second support member in the second direction is separated from the second support member in the third direction, and wherein a second portion of the hinge and a second portion of the hinge cover are disposed between the second back cover and the display module when the display module is unfolded; a first protrusion extending from the edge of the first back cover in a fourth direction opposite the third direction; and a second protrusion extending from the edge of the second back cover in the fourth direction, wherein the first protrusion and the second protrusion contact a middle portion of hinge cover when the display module is unfolded, and the first protrusion and the second protrusion contact the one or more dust caps when the display module is folded.

The dust caps may be made of a different material from the hinge cover. The dust caps may be made of a rubber or silicone material, and the hinge cover may be made of a metal material. An outer side surface of the dust caps may overlap an inner side surface of the first protrusion and an inner side surface of the second protrusion in a thickness direction when the display module is folded.

Each of the inner side surface of the first protrusion and the inner side surface of the second protrusion may comprise an inclined surface, and the outer side surface of the dust caps may comprise a reverse inclined surface contacting the inclined surface of each of the inner side surface of the first protrusion and the inner side surface of the second protrusion when the display module is folded.

An upper surface of the dust caps may be in contact with a lower surface of the first support member and a lower surface of the second support member when the display module is unfolded. An upper surface of the dust caps may be in contact with a lower surface of the first support member and a lower surface of the second support member when the display module is unfolded.

One inner side surface of the first back cover may comprise a first round portion surrounding the hinge cover, and one inner side surface of the second back cover may comprise a second round portion surrounding the hinge cover. The upper surface of the first round portion and the upper surface of the second round portion may be spaced apart from the lower surface of the hinge cover by a first distance when the display module is unfolded.

The first protrusion may be disposed at one end of the first round portion, and the second protrusion may be disposed at one end of the second round portion adjacent to the one end of the first round portion. The upper surface of the first protrusion and the upper surface of the second protrusion may be spaced apart from the lower surface of the hinge cover by a second distance. The second distance may be shorter than the first distance. The display module may comprise a second region not contacting the first support member and the second support member when the display module is folded.

According to one or more embodiments of the invention, a foldable display device comprises: a first support member and a second support member, which are separated from each other, a display module disposed on the first support member and the second support member, a hinge coupling one side of the first support member and one side of the second support member, a hinge cover surrounding the hinge and comprising a first dust cap on an upper edge thereof, a first back cover disposed under the first support member and comprising a second dust cap at one end thereof, and a second back cover disposed under the second support member and comprising a third dust cap at one end thereof, the first dust cap is in contact with the second dust cap and the third dust cap when the display module is folded.

The first dust cap may be made of a different material from the hinge cover, and each of the second dust cap and the third dust cap may be made of different materials from each of the first back cover and the second back cover. The first to third dust caps may be made of a rubber or silicone material, and the first back cover and the second back cover may be made of a metal material. An outer side surface of the first dust cap may overlap an inner side surface of the second dust cap and an inner side surface of the third dust cap in a thickness direction when the display module is folded.

Each of the inner side surface of the second dust cap and the inner side surface of the third dust cap may comprise an inclined surface, and the outer side surface of the first dust cap may comprise a reverse inclined surface contacting the inclined surface of each of the inner side surface of the second dust cap and the inner side surface of the third dust cap when the display module is folded.

An upper surface of the first dust cap may be in contact with a lower surface of the first support member and a lower surface of the second support member when the display module is unfolded. A lower surface of the hinge cover may comprise a groove, and the second dust cap and the third dust cap may be inserted into the groove when the display module is unfolded.

According to another embodiment, a foldable display device comprises a display module disposed on a first support member and a second support member; a hinge coupling the first support member to the second support member; a first back cover disposed on the first support member and comprising a first protrusion; a second back cover disposed on the second support member and comprising a second protrusion; and a hinge cover comprising one or more dust caps, wherein the one or more dust caps contact the first protrusion and the second protrusion when the display module is folded, and do not contact the first protrusion and the second protrusion when the display module is unfolded.

In some embodiments, the one or more dust caps, the first protrusion and the second protrusion each comprise a beveled edge, and wherein the beveled edge of the one or more dust caps contacts the beveled edge of the first protrusion and the beveled edge of the second protrusion when the display module is folded. In some embodiments, the hinge cover comprises a groove, wherein at least a portion of the first protrusion and at least a portion the second protrusion are within the groove when the display module is unfolded.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
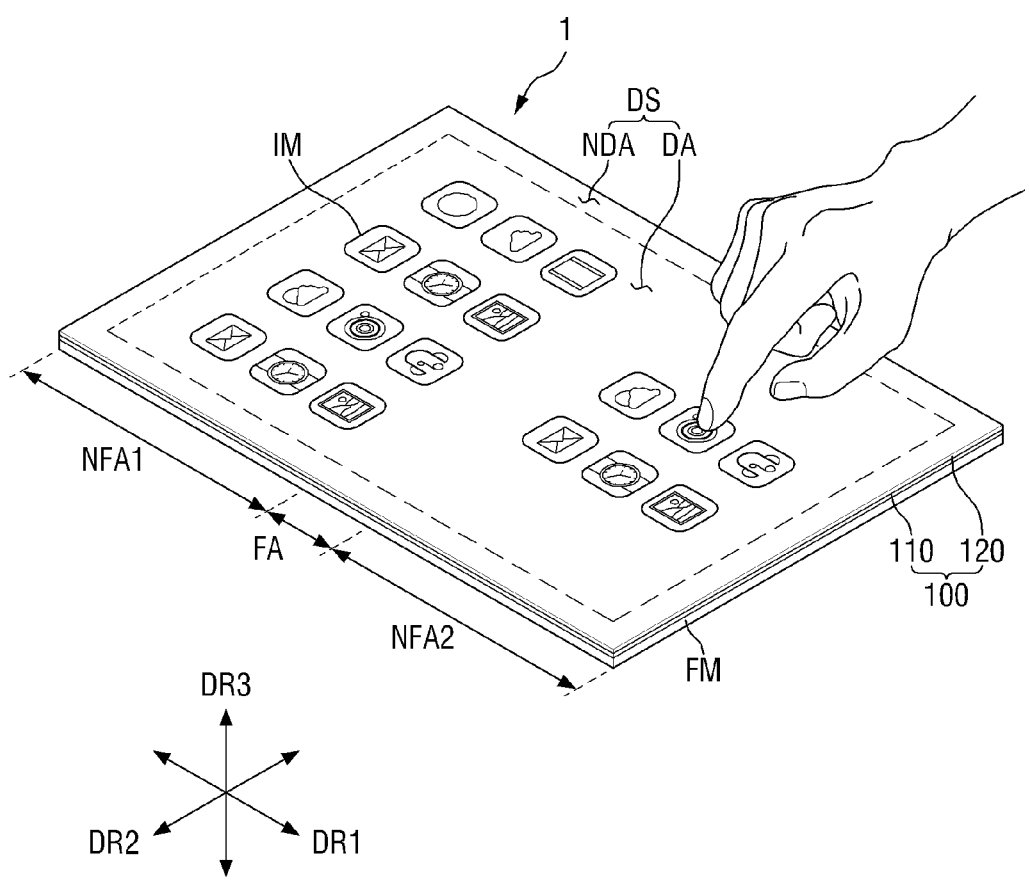
FIG. 1 is a perspective view of a foldable display device according to an embodiment.

The present disclosure relates to a foldable display device that includes plates separated from each other to fold and support a display panel. The plates that are separated from each other may be rotatably coupled by a hinge. A cover case and a hinged case may be attached to each of the lower sides of the plates and the lower side of the hinge. A gap may occur between the cover case and the hinge case, to prevent friction between the cover case and the hinge case during a hinge operation. The creation of a gap can be prevented, or reduced, by using protrusions included in each of the cover case and the hinge case.

In the following description, for the purposes of explanation, numerous specific details are set forth to provide a thorough understanding of various exemplary embodiments or implementations of the present disclosure. As used herein, "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, the element may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature. The shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, the blocks, units, and/or modules may be programmed and controlled using software (e.g., microcode) to perform various functions discussed herein and may optionally be driven by firmware and/or software. It is also contemplated that each block, unit, and/or module may be implemented by dedicated hardware or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense unless expressly so defined herein.

Figure 2:
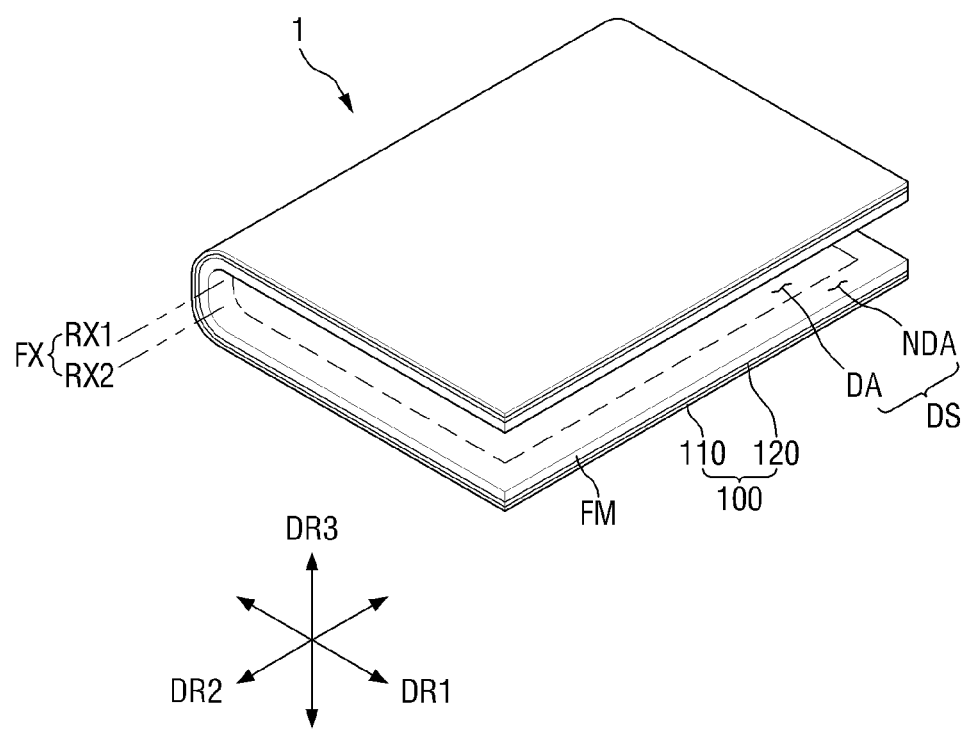
FIG. 2 is a view showing a state in which the foldable display device shown in FIG. 1 is inner-folded.

FIG. 1 is a perspective view of a foldable display device according to an embodiment, and FIG. 2 is a view showing a state in which the foldable display device shown in FIG. 1 is inner-folded.

Referring to FIGS. 1 and 2, a foldable display device 1, according to an embodiment of the present disclosure, may have a rectangular shape. The rectangular shape may have long sides in a first direction DR1 and short sides in a second direction DR2 in a second direction DR2, crossing the first direction DR1. However, the present disclosure is not limited thereto, and the foldable display device 1 may have various shapes. The foldable display device 1 may be a foldable display device 1. The foldable display device 1 may be a foldable display device 1 that can be folded or unfolded based on the folding axis FX extending in the second direction DR2.

The foldable display device 1 may be divided into a plurality of areas according to folding. For example, the foldable display device 1 may be divided into a folding area FA and two non-folding areas. The folding area FA is where the foldable display device 1 is folded. The two non-folding areas NFA1 and NFA2 are where the foldable display device 1 is flat. The non-folding areas NFA1 and NFA2 are arranged in the first direction DR1, and the folding area FA is disposed between the two non-folding areas NFA1 and NFA2. In this embodiment, one folding area FA is defined in the foldable display device 1, but the present disclosure is not limited thereto. A plurality of folding areas may be defined in the foldable display device 1.

The folding axis FX includes a first rotation axis RX1 and a second rotation axis RX2 that extend in the second direction DR2 providing a biaxial rotation axis to the foldable display device 1. The first rotation axis RX1 and the second rotation axis RX2, that extend in the second direction DR2, are disposed adjacent to each other. The folding area FA may overlap the first rotation axes RX1 and second rotation axes RX2. The foldable display device 1 may be folded based on the first rotation axis RX1 and the second rotation axis RX2.

The foldable display device 1 includes a display module 100 and a folding member FM disposed under the display module 100. The upper surface of the display module 100 may be defined as a display surface DS and may be a plane parallel to the first direction DR1 and the second direction DR2. Images IM generated in the display module 100 may be provided to a user through the display surface DS.

The display surface DS includes a display area DA and a non-display area NDA around the display area DA. The display area DA may display an image, and the non-display area NDA may not display an image. The non-display area NDA may surround the display area DA and may provide an edge portion of the foldable display device 1 printed in a predetermined color.

The display module 100 is flexible and includes a display panel 110 and a touch sensing unit 120 disposed on the display panel 110. The display panel 110 may generate an image and provide the image to a user. The display panel 110 may be a liquid crystal display panel, an organic light-emitting display panel including an organic light-emitting diode (OLED) or a quantum dot electroluminescent (QD-EL) device, an electrophoretic display panel, or an electrowetting display panel, or may be any one of various display panels capable of displaying an image.

A quantum dot, which is a semiconductor material with a crystalline structure of several nanoscales, is composed of hundreds to thousands of atoms. Since quantum dots are very small, the quantum dots have a large surface area per unit volume. Additionally, atoms are present on the surface of nanocrystals and exhibit a quantum confinement effect. Due to the quantum confinement effect, the emission wavelengths of the quantum dots may be adjusted by controlling the size of the quantum dots. Characteristics such as color purity and high photoluminescence (PL) emission efficiency may be exhibited. The quantum dot electroluminescent element (QD-EL) device may be a three-layer device including a hole transport layer (HTL) and an electron transport layer (ETL) at both ends thereof with a quantum dot light-emitting layer therebetween.

The touch sensing unit 120 may detect an external input (such as a user's hand or a touch pen), convert the external input into a predetermined input signal, and provide the input signal to the display panel 110. The touch sensing unit 120 may include a plurality of touch sensors (not shown) for detecting an external input. The touch sensors may detect an external input in a capacitive manner. The display panel 110 may receive an input signal from the touch sensing unit 120 and generate an image corresponding to the input signal.

The folding member FM may support the display module 100 and may be folded while being rotated based on the first rotation axes RX1 and second rotation axes RX2. Since the folding member FM may be folded, the display module 100 with flexibility may be folded by the folding member FM. When the foldable display device 1 is folded, the folding member FM may inner-fold the foldable display device 1 such that the display surfaces of different areas of the display module 100 face each other.

A detailed configuration of the folding member FM will be described below in detail with reference to FIG. 4. Hereinafter, the direction crossing the plane parallel to the first direction DR1 and the second direction DR2 is defined as a third direction DR3. The third direction DR3 may include an upper direction and a lower direction opposite to the upper direction.

Figure 3:
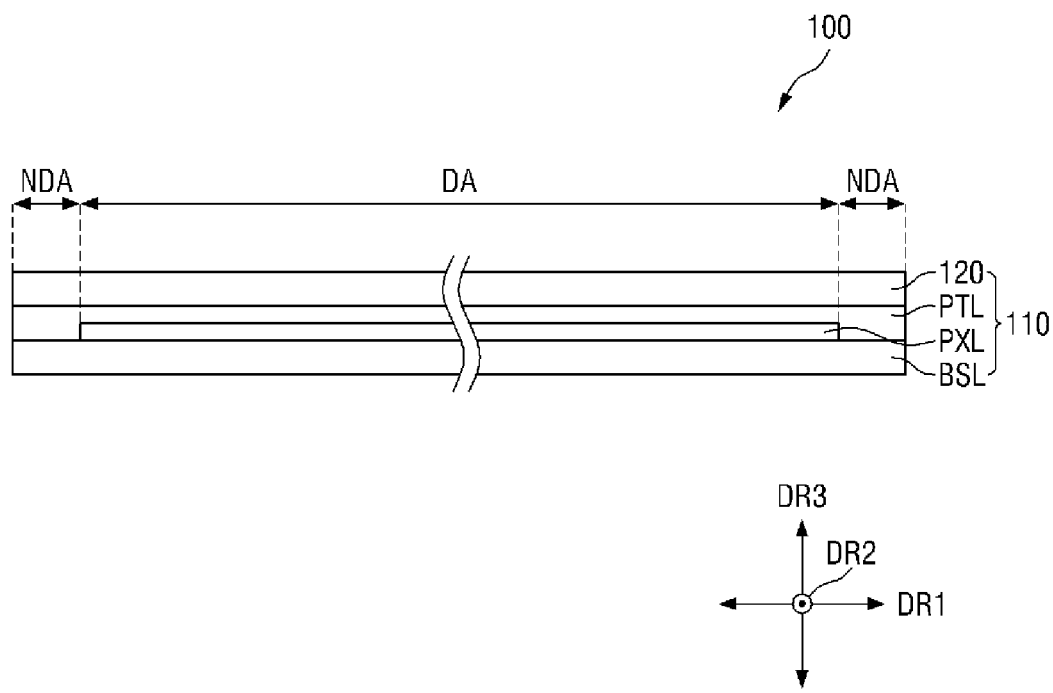
FIG. 3 is a cross-sectional view of the foldable display device shown in FIG. 1.

FIG. 3 is a cross-sectional view of the foldable display device shown in FIG. 1.

Referring to FIG. 3, the display panel 110 includes a base layer BSL, a pixel layer PXL, and a protective layer PTL. The pixel layer PXL may be disposed on the base layer BSL. The protective layer PTL may be disposed on the base layer BSL to cover the pixel layer PXL.

The base layer BSL may define a back surface of the display module 100 and may have flexibility. The pixel layer PXL may include a plurality of pixels (not shown) and may be driven by receiving an electrical signal to generate images IM. The protective layer PTL may protect the pixel layer PXL, and the touch sensing unit 120 may be disposed on the protective layer PTL. The protective layer PTL may be formed to have a multi-layer structure and may include an organic insulating film or an inorganic insulating film.

Although not shown, the display module 100 may further include a window on the touch sensing unit 120. The window serves to cover and protect the display module 100.

The window may be made of a transparent material. The window may include plastic, in which case the window may have flexible properties.

Examples of plastic applicable to the window may include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymers, polyethersulphone (PES), polyetherimide (PEI), polyphenylene sulfide (PPS), polyallylate, tri-acetyl cellulose (TAC), and cellulose acetate propionate (CAP). The window may include at least one of the plastic materials listed above.

Figure 4:
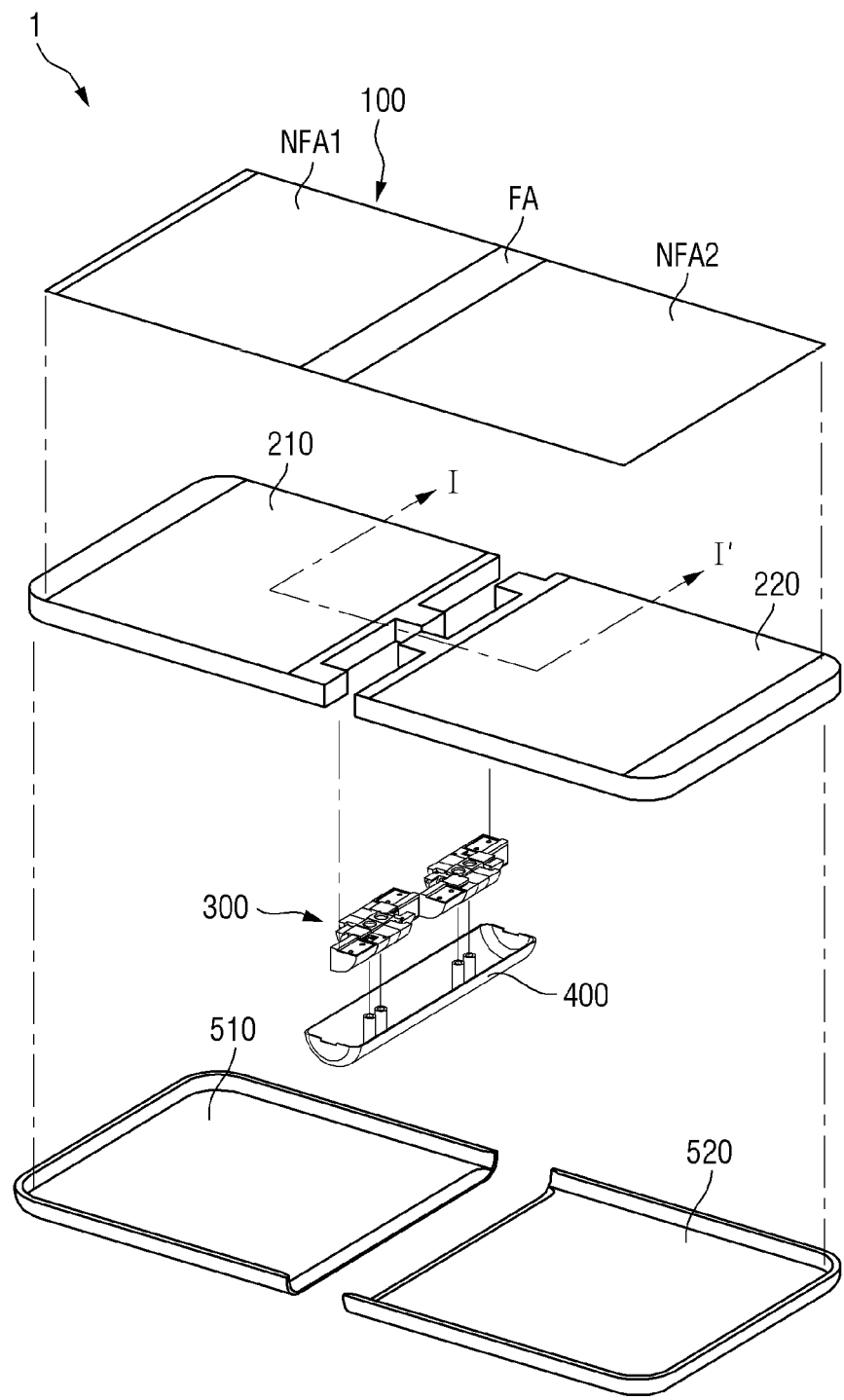
FIG. 4 is an exploded perspective view of the foldable display device shown in FIG. 1.

FIG. 4 is an exploded perspective view of the foldable display shown in FIG. 1.

Referring to FIG. 4, the foldable display device 1 includes a display module 100 and a folding member 200. The folding member 200 includes a first support member 210, a second support member 220, a hinge 300, a hinge cover 400, a first back cover 510, and a second back cover 520.

The first support member 210 and second support member 220 may be arranged in the first direction DR1. The display module 100 may be disposed on the first support member 210 and second support member 220 and the hinge 300.

One side of the first support member 210 and one side of the second support member 220 are disposed to face each other. The folding area FA of the display module 100 is disposed on a coupling location between the first support member 210 and second support member 220, and the hinge 300. Each of the non-folding areas NFA1 and NFA2 of the display panel are disposed on the upper surfaces of each of the first support member 210 and second support member 220.

The hinge 300 is connected to one side of the first support member 210 and one side of the second support member 220, which face each other in the first direction DR1. The hinge 300 provides rotation axes RX1 and RX2 to each of one side of the first support member 210 and one side of the second support member 220. The rotation axes include a first rotation axis RX1 a second rotation axis RX2. The first rotation axis RX1 is provided to one side of the first support member 210. The second rotation axis RX2 is provided to one side of the second support member 220.

The hinge 300 includes a plurality of hinge structures 300_1 and 300_2 arranged in the second direction DR2 and disposed between the first support member 210 and the second support member 220. Illustratively, although the hinge 300 includes two hinge structures 300_1 and 300_2, the number of the hinge structures 300_1 and 300_2 is not limited thereto.

The hinge 300 will be described in detail with reference to FIGS. 5 to 12.

The first back cover 510 may be disposed on the back surface of the first support member 210 to cover the first support member 210. The first back cover 510 may be disposed to cover a part of the hinge cover 400 (for example, an upper-end portion of a lower surface of the hinge cover). The hinge cover 400 may be disposed between the first support member 210 and the second support member 220. The first back cover 510 may have rounded corners. The first back cover 510 may be empty inside or may form an empty space between the first back cover 510 and the first support member 210 while being fastened to the first support member 210. For example, the first back cover 510 may have a structure in which a rectangular bottom surface and three side walls extending from the bottom surface are formed. For example, one side of the first back cover 510 may be open without sidewalls.

The second back cover 520 may be disposed on the back surface of the second support member 220 to cover the second support member 220. The second back cover 520 may be disposed to cover other parts of the hinge cover 400 (for example, a lower end portion of the hinge cover), which may be partially covered by the second back cover 520. Similarly to the first back cover 510, the second back cover 520 may also have rounded corners. The second back cover 520 may be empty inside. The second back cover 520 may also form an empty space between the second back cover 520 and the second support member 220 while being engaged to the second support member 220. In this regard, the second back cover 520 may have a structure in which a rectangular bottom surface and three side walls extending from the bottom surface are formed. For example, one side of the second back cover 520 may be open without sidewalls.

The hinge 300 may be seated and fixed to the hinge cover 400. The hinge cover 400 may be covered by one side of the first back cover 510 and one side of the second back cover 520. Additionally, the hinge cover 400 may be exposed to the outside according to the folded state of the foldable display device 1. For example, when the foldable display device 1 is unfolded, the hinge cover 400 may be covered by the first back cover 510 and the second back cover 520. When the foldable display device 1 is folded, the hinge cover 400 may be disposed to be exposed to the outside from the sides of the first back cover 510 and the second back cover 520.

Hereinafter, the hinge 300 will be described in detail with reference to FIGS. 5 to 12.

Figure 5:
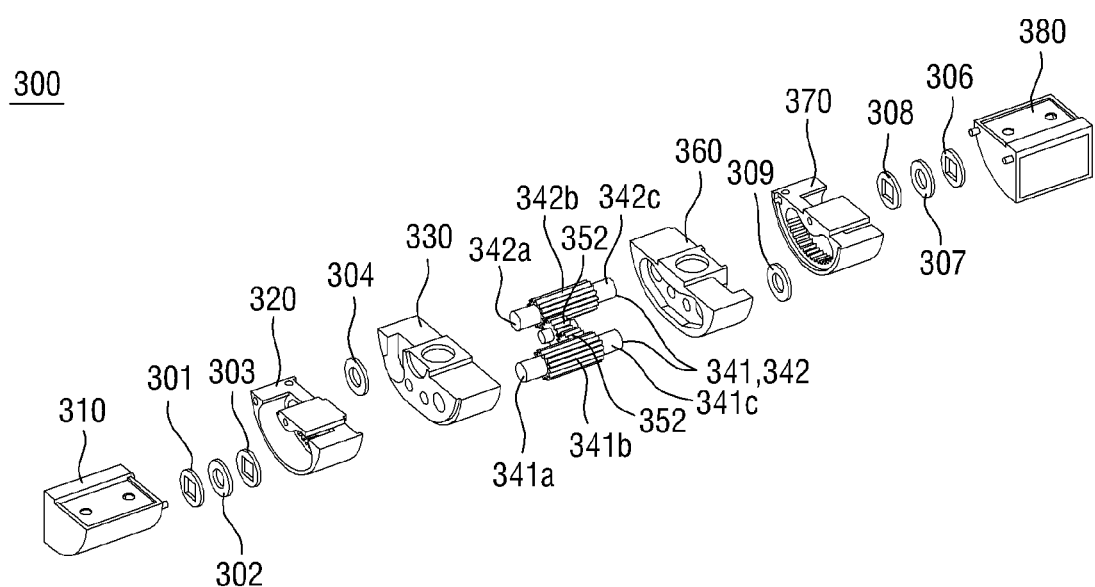
FIG. 5 is an exploded perspective view of a hinge of a foldable display device according to an embodiment.
Figure 6:
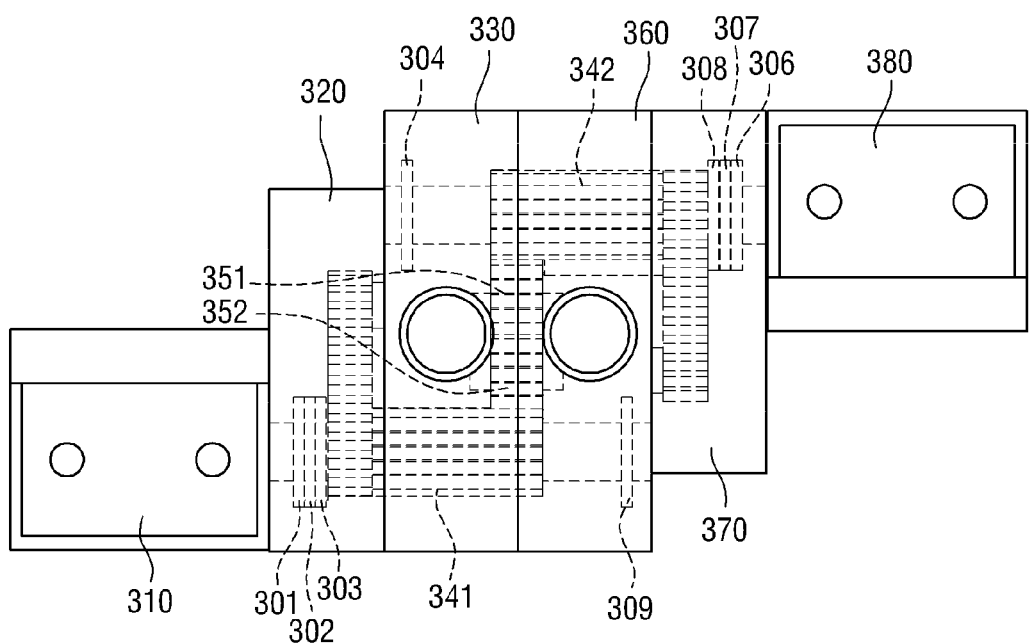
FIG. 6 is a view showing a coupled state of a hinge of a foldable display device according to an embodiment.

FIG. 5 is an exploded perspective view of a hinge of a foldable display device according to an embodiment. FIG. 6 is a view showing a coupled state of a hinge of a foldable display device according to an embodiment.

Referring to FIGS. 5 and 6, at least a part of the hinge 300, according to an embodiment, may include a first bracket housing 310, first housing washer rings 301 and 303, a first plate spring 302, a first bracket inner gear 320, a first gear washer ring 304, a first bracket center 330, a first main gear 341 (for example, a toothed spur gear), first shaft gear 351 (for example, a toothed spur gear), a second shaft gear 352 (for example, a toothed spur gear), a second main gear 342 (for example, a toothed spur gear), a second bracket center 360, a second gear washer ring 309, a second bracket inner gear 370, a second plate spring 307, second housing washer rings 306 and 308, and a second bracket housing 380.

The first bracket housing 310 may be disposed adjacent to the first bracket inner gear 320 and may be fixed to the first bracket inner gear 320. For example, at least one protrusion may be provided on the right side of the first bracket housing 310. The at least one protrusion may be inserted into and fixed to a groove provided in the first bracket inner gear 320. The first bracket housing 310 may have a cross-section of an arc with a square angle with a predetermined angle (for example, a right angle). The upper end of the first bracket housing 310 may be coupled (for example, screwed) with the second support member 220. The side portion of the first bracket housing 310 may be coupled (for example, magnetically coupled) to the first support member 210. Thus, the first bracket housing 310 may rotate during the hinge operation of the second support member 220. Additionally, the first bracket housing 310 may also be magnetically coupled to the first support member 210 while the first support member 210 and the second support member 220 are arranged in parallel. The first bracket housing 310 may be separated from the first support member 210 while the first support member 210 and the second support member 220 are folded. The curved portion of the first bracket housing 310 may be disposed to face the inside of the hinge housing 150. The first bracket housing 310 may be made of a material with predetermined rigidity (for example, a metal material), but the material of the first bracket housing 310 is not limited thereto.

The first housing washer rings 301 and 303 may be disposed between the first bracket housing 310 and the first bracket inner gear 320. The first plate spring 302 may be disposed between the first housing washer rings 301 and 303. The first housing washer rings 301 and 303 and the first plate spring 302 may be fixed to the first bracket inner gear 320 by a rivet. According to various embodiments, the rivet may be replaced by another fastening member such as a nut or an E-shaped ring. The first housing washer rings 301 and 303 and the first plate spring 302 may be seated in a groove provided at one side of the first bracket inner gear 320. A hole penetrating the first bracket inner gear 320 may be provided inside the groove. A part of the first main gear 341 penetrating the first bracket center 330 and the second bracket center 360 may be disposed in the hole.

The first bracket housing 310 may be fixed to the first side (for example, left side in FIG. 6) of the first bracket inner gear 320. The first bracket center 330 may be disposed on the second side (for example, right side in FIG. 6) of the first bracket inner gear 320. The first bracket inner gear 320 may rotate along the side surface of the first bracket center 330. The first bracket inner gear 320 may be formed in a semi-elliptic shape. An internal gear, engaging with the first main gear 341, may be provided inside the first bracket inner gear 320. The internal gear may be provided in the shape of a half ellipse arc. The first bracket inner gear 320 may be made of a metal material with predetermined rigidity. For example, the first bracket inner gear 320 may be made of the same material as the first bracket housing 310. In various embodiments, the material of the first bracket inner gear 320 is not limited to the aforementioned metal material.

The first gear washer ring 304 may be disposed between the first bracket inner gear 320 and the first bracket center 330. For example, the first gear washer ring 304 may be seated in a groove (or hole) provided in the first bracket center 330. One side of the second main gear 342 penetrating the first bracket center 330 and the second bracket center 360 may be inserted into the first gear washer ring 304.

The first bracket center 330 may be disposed between the first bracket inner gear 320 and the second bracket center 360. The first bracket center 330 may be provided in a semi-elliptical shape larger than the first bracket inner gear 320. The first bracket center 330 may be provided with a hole into which a part of the first main gear 341 is inserted and a hole into which a part of the second main gear 342 is inserted. A hole vertically penetrating the first bracket center 330 may be provided at the center (for example, from the center of the flat upper end to the bottom in the semi-elliptical shape) of the first bracket center 330. A boss provided in the hinge housing 150 may be inserted into the hole vertically penetrating the first bracket center 330.

The first main gear 341 (or the first shaft) may penetrate the first bracket center 330 and the second bracket center 360. One side of the first main gear 341 may be disposed in the internal gear provided in the first bracket inner gear 320. The first main gear 341 may include a first left penetration portion 341a protruding to the left side of the first bracket inner gear 320 and penetrating the first housing washer rings 301 and 303 and the first plate spring 302. The first main gear 341 may also include a first gear pattern portion 341b extending from the first left penetration portion 341a. One side thereof being partially coupled to the internal gear of the first bracket inner gear 320 and the other side thereof being partially connected to the first shaft gear 351. Additionally, the first main gear 341 may include a first right penetration portion 341c passing through the hole provided in the second bracket center 360 to insert the second gear washer ring 309 thereinto. The first main gear 341 may be divided into the first left penetration portion 341a, the first gear pattern portion 341b, and the first right penetration portion 341c according to a function or a position. The first left penetration portion 341a, the first gear pattern portion 341b, and the first right penetration portion 341c may have a continuous structure.

One side of the first shaft gear 351 may be engaged with the gear pattern portion provided in the first main gear 341. The other side thereof may be engaged with the second shaft gear 352. Thus, while the first main gear 341 rotates, the first shaft gear 351 may transmit a rotational force to the second shaft gear 352. The first shaft gear 351 may be disposed inside the cavity formed while the first bracket center 330 and the second bracket center 360 are coupled to each other.

One side of the second shaft gear 352 may be engaged with the gear pattern portion provided in the second main gear 342. The other side thereof may be engaged with the first shaft gear 351. Thus, while the second main gear 342 rotates, the second shaft gear 352 may transmit a rotational force to the first shaft gear 351. The second shaft gear 352 may be disposed inside the cavity formed while the first bracket center 330 and the second bracket center 360 are coupled to each other. According to various embodiments, to reduce the set thickness of the foldable display device 1, the sizes and number of idle gears (for example, the first shaft gear 351 and the second shat gear 352) may be changed. Accordingly, the foldable display device 1 of the present disclosure is not limited to the number and size of the shaft gears. For example, the first shaft gear 351 and the second shaft gear 352 may be provided in a small size of a predetermined size or less to reduce the set thickness of the foldable display device 1. Accordingly, the foldable display device 1 may have a hinge structure, including two first shaft gears and two second shaft gears. The size of the two first shaft gears or the two second shaft gears may be half the size of one first shaft gear or one second shaft gear. Alternatively, the hinge structure of the foldable display device 1 may include three first shaft gears and three second shaft gears.

Similar to the first main gear 341, the second main gear 342 may include a second right penetration portion 342c, a second gear pattern portion 342b, a second left penetration portion 342a. The second right penetration portion 342c penetrates to the right side of the second bracket inner gear 370, inserting the second housing washer rings 306 and 308 and the second plate spring 307 thereinto. The second gear pattern portion 342b has one side partially coupled to the internal gear of the second bracket inner gear 370 and the other side partially connected to the second shaft gear 352. The second left penetration portion 342a passes through the hole provided in the first bracket center 330 to insert the first gear washer ring 304 thereinto. The left or right direction of the aforementioned penetration portions is based on the shown drawing and may be named differently according to a change in the arrangement direction.

The second bracket center 360 may be disposed between the first bracket center 330 and the second bracket inner gear 370. The second bracket center 360 may be provided in substantially the same shape (for example, a semi-elliptic shape larger than the second bracket inner gear 370) as the first bracket center 330. The second bracket center 360 may be provided with a through hole. The first main gear 341 and the second main gear 342 pass through the through hole in the second bracket center 360. The second bracket center 360 may be provided with a hole vertically penetrating from a flat upper end to a lower end for the boss coupling of the hinge housing 150.

The second gear washer ring 309 may be seated in a groove provided in the second bracket center 360. Additionally, the second gear washer ring 309 may be seated while engaging with the end of the first right penetration portion 341c of the first main gear.

The second bracket inner gear 370 may be disposed between the second bracket center 360 and the second bracket housing 380. The shape and material of the second bracket inner gear 370 may be substantially the same as the shape and material of the first bracket inner gear 320. For example, the first bracket inner gear 320 may be provided to have a semi-elliptical shape with a size smaller than that of the second bracket center 360. An internal gear for engaging with the second main gear 342 may be provided in a predetermined area.

The second housing washer rings 306 and 308 and the second plate spring 307 may be seated in a groove (or a hole) provided at one side of the second bracket inner gear 370. Additionally, the second housing washer rings 306 and 308 and the second plate spring 307 may be coupled with the second right penetration portion 342c of the second main gear 342. The second plate spring 307 may be disposed between the second housing washer rings 306 and 308 to apply an elastic force to the second housing washer rings 306 and 308 in left and right directions.

The second bracket housing 380 may be provided in substantially the same shape and material as the first bracket housing 310 and may be disposed in a direction opposite to the first bracket housing 310. For example, the second bracket housing 380 may be fixed to one side of the first bracket inner gear 320. The second bracket housing 380 may include a curved portion with an outer circumferential surface with a predetermined curvature, and end portions forming the curved portion. The upper-end portion of the end portions may be engaged (for example, screwed) with the first support member 210. The side end portion of the end portions may be coupled (for example, magnetically coupled) to the second support member 220.

Figure 7:
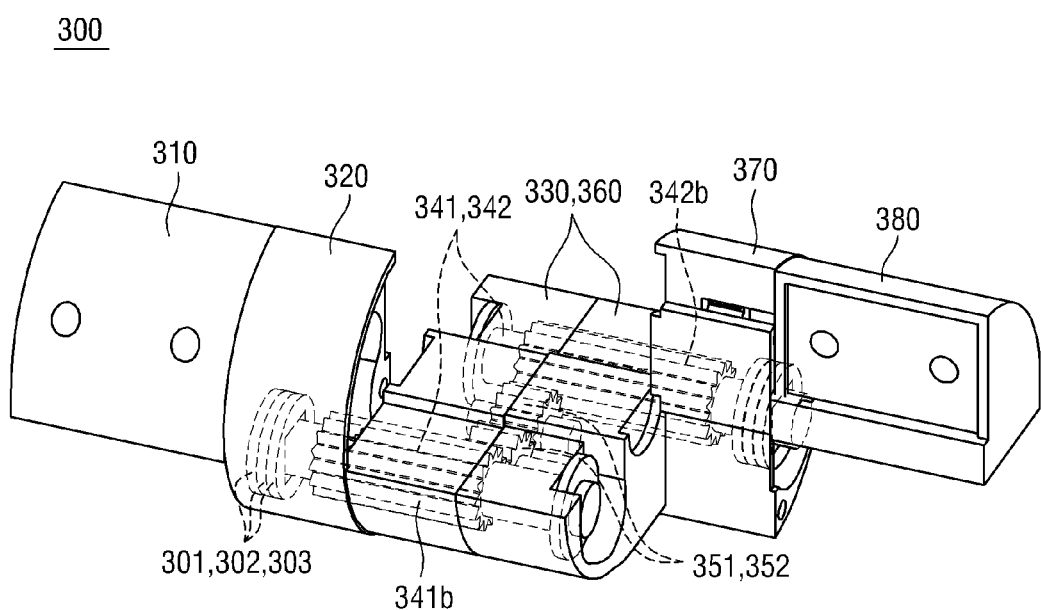
FIG. 7 is a view showing a rotation state of a hinge of a foldable display device according to an embodiment.

FIG. 7 is a view showing a rotation state of a hinge of a foldable display device according to an embodiment.

Referring to FIGS. 5 and 7, in the hinge 300 according to an embodiment, the side portions of the first bracket center 330 and the second bracket center 360 (for example, the right side portion of the first bracket center 330 and the left side portion of the second bracket center 360 based on the drawing) may be disposed to face each other. The first main gear 341 may be disposed to pass through holes provided in the lower side based on the drawings among the holes of the first bracket center 330 and the second bracket center 360. One side of the first gear pattern portion 341b of the first main gear 341 may be engaged with an internal gear of the first bracket inner gear 320. The second main gear 342 may be disposed to pass through holes provided in the upper side based on the drawings among the holes of the first bracket center 330 and the second bracket center 360. One side of the second gear pattern portion 342b of the second main gear 342 may be engaged with an internal gear of the second bracket inner gear 370. The first bracket housing 310 may be coupled to the left side of the first bracket inner gear 320. The second bracket housing 380 may be coupled to the right side of the second bracket inner gear 370.

An example embodiment of the present disclosure describes the first bracket housing 310 coupled to the second support member 220, and the second bracket housing 380 coupled to the first support member 210. When an external pressure is applied to the first support member 210 or the second support member 220, the first bracket housing 310 and the first bracket inner gear 320 may be disposed to be rotated with respect to the first bracket center 330. The rotation may be a first angle (for example, 90°) in the counterclockwise direction from the initial state. The rotation provides for the first support member 210 and the second support member 220 to be folded in a direction facing each other. Similarly, the second bracket housing 380 and the second bracket inner gear 370 may be disposed to be rotated with respect to the second bracket center 360 by a first angle (for example, 90°) in the clockwise direction from the initial state. The first direction and the second direction may be directions opposite to each other.

Figure 8A:
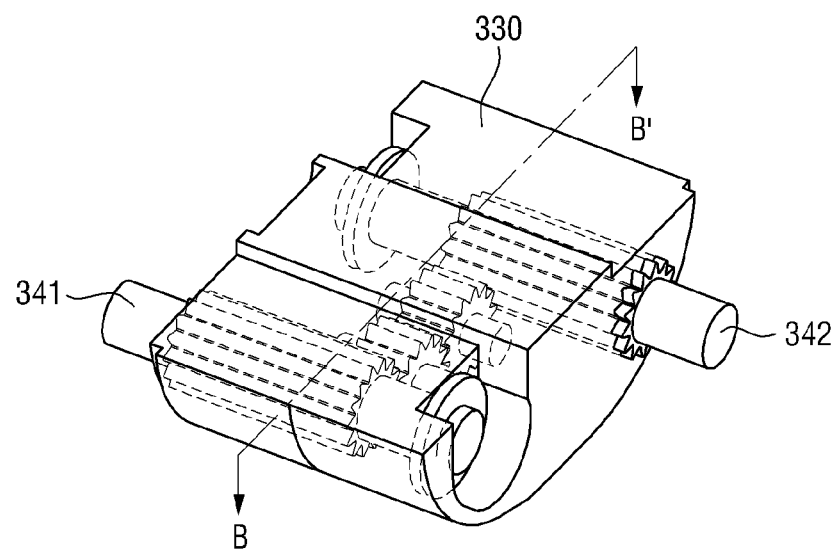
FIGS. 8A and 8B are views showing an example of a coupled state of components related to bracket centers of a foldable display device according to an embodiment.
Figure 8B:
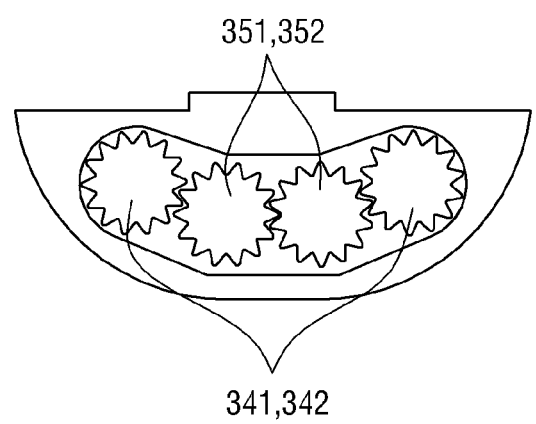

FIGS. 8A and 8B are views showing an example of a coupled state of components related to bracket centers of a foldable display device according to an embodiment.

Referring to FIGS. 8A and 8B, as described above, the hinge 300, according to an embodiment, may include the first bracket housing 310, the first bracket inner gear 320, the first bracket center 330, the second bracket center 360, the second bracket inner gear 370, and the second bracket housing 380.

8A and 8B show the bracket centers 330, 360, the main gears 341, 342 and the shaft gears 351, 352. The first main gear 341 and the second main gear 342 may be disposed to penetrate the first bracket center 330 and the second bracket center 360.

FIG. 8B is a cross-sectional view taken along the line B-B' of FIG. 8A. As shown in FIG. 8B, the first shaft gear 351 engaged with the first main gear 341 and the second shaft gear 352 engaged with the second main gear 342 may be disposed in the central cavity formed by coupling the bracket center 330 and bracket center 360. The first main gear 341 rotates in the first direction (for example, clockwise direction) and the first shaft gear 351 may rotate in the second direction (for example, counterclockwise direction). The second shaft gear 352 engaged with the first shaft gear 351 may rotate again in the first direction. The second main gear 342 engaged with the second shaft gear 352 may rotate in the second direction. As described above, the first main gear 341 and the second main gear 342 may be rotated in directions opposite to each other by the first shaft gear 351 and the second shaft gear 352.

Figure 9A:
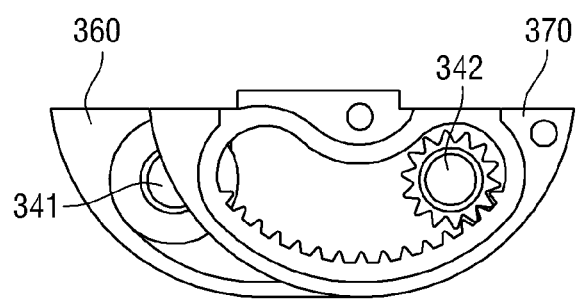
FIGS. 9A and 9B are views showing an example of an operation state of bracket centers and bracket inner gears of a foldable display device according to an embodiment.
Figure 9B:
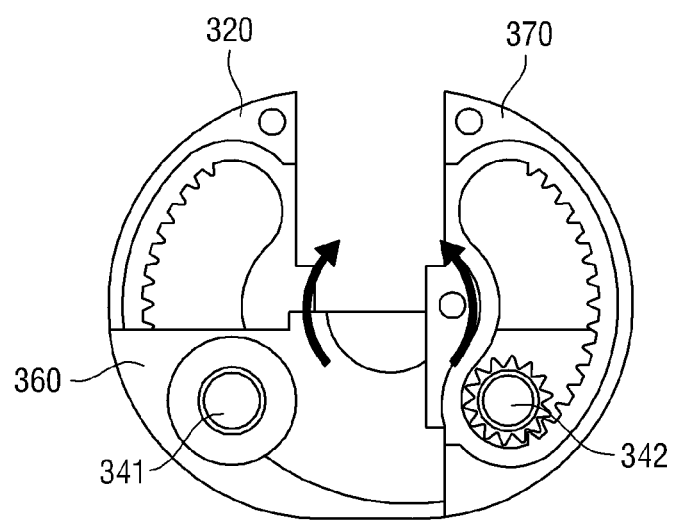
Figure 10:
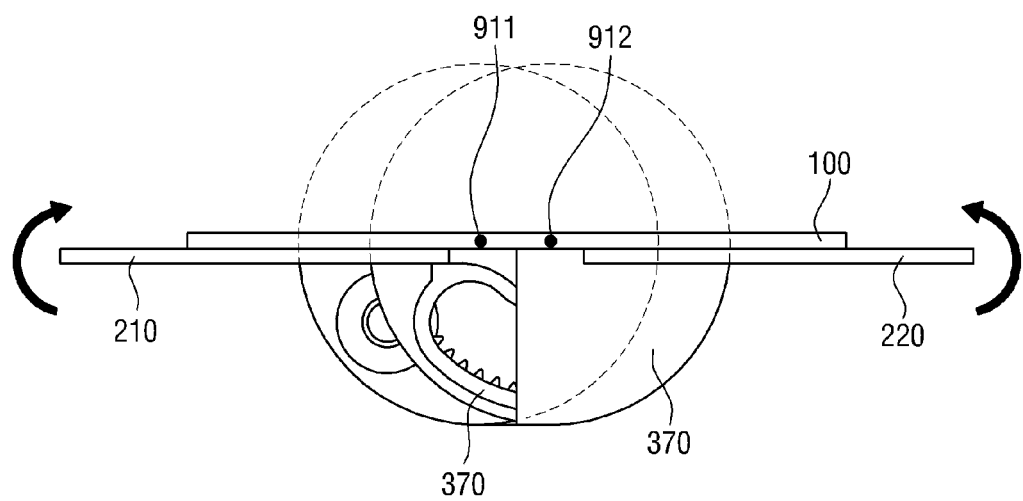
FIG. 10 is a view showing a layout state of a foldable display device with respect to a layout form of a hinge according to an embodiment.

FIGS. 9A and 9B are views showing an example of an operation state of bracket centers and bracket inner gears of a foldable display device according to an embodiment. FIG. 10 is a view showing a layout state of a foldable display device with respect to a layout form of a hinge according to an embodiment.

Referring to FIG. 9A, FIG. 9A shows a state where at least a part of a hinge structure seen in a direction in which the second bracket inner gear 370 is disposed when the foldable display device 1 is flat. Referring to FIG. 9B, FIG. 9B shows a state where at least a part of a hinge structure seen in a direction in which the second bracket inner gear 370 is disposed when the foldable display device 1 is folded at a second angle. For example, at an angle at which the first support member and the second support member face each other.

Figure 14:
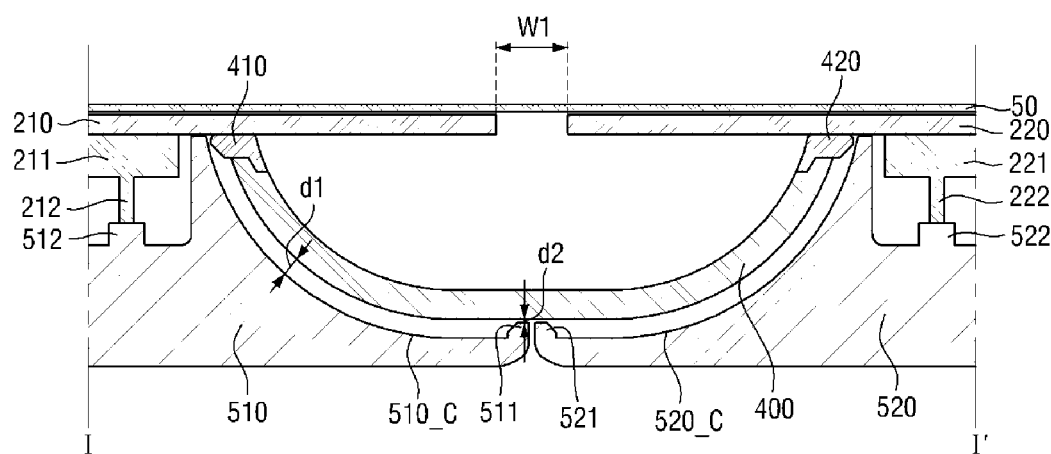
FIG. 14 is a cross-sectional view of a foldable display device taken along the line I-I' of FIG. 4 according to an embodiment.

As shown in FIG. 14, in a state where the display module 100 of the foldable display device 1 is unfolded flat, the display module 100 may include a first region W1 not attached to the first support member 210 and the second support member 220.

Figure 15A:
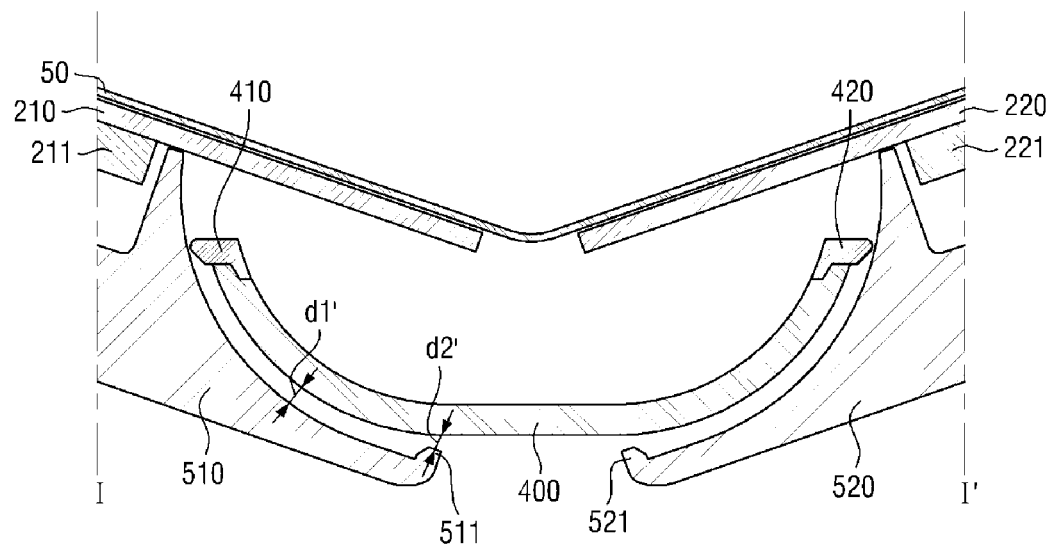
FIGS. 15A and 15B are perspective views showing a folded state of a foldable display device according to an embodiment.
Figure 15B:
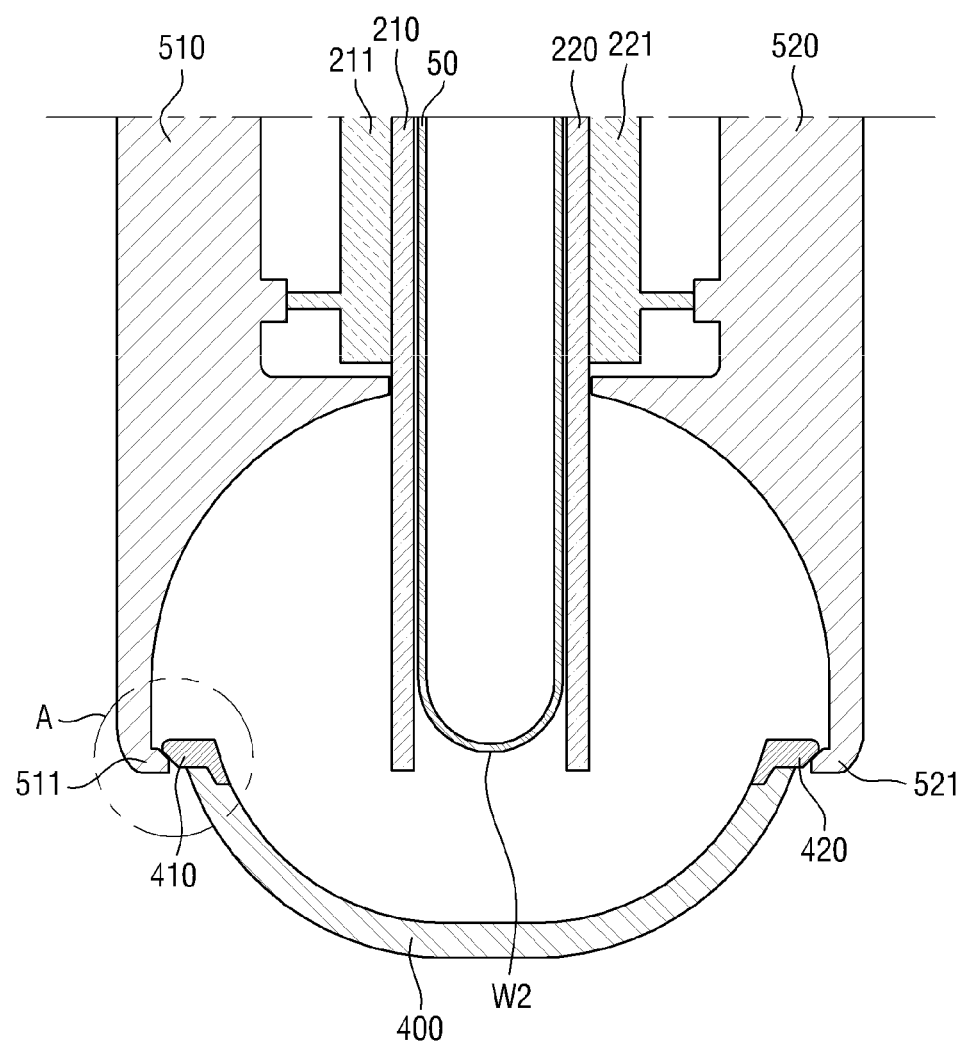

As shown in FIG. 15B, in a state where the display module 100 of the foldable display device 1 is folded, the display module 100 may include a second region W2 not attached to the first support member 210 and the second support member 220.

FIGS. 9A and 9B are views showing the shape of the second bracket inner gear 370 coupled to the second bracket center 360. A part of the gear pattern portion of the second main gear 342, disposed toward a right side with respect to the longitudinal centerline of the second bracket center 360, may be engaged with the internal gear 371 of the second bracket inner gear 370, and may be rotated by external pressure. For example, when a force is continuously applied, the second bracket inner gear 370 may be disposed in parallel with the longitudinal centerline of the second bracket center 360. As the second bracket inner gear 370 rotates, the first bracket inner gear 320 may rotate in a direction opposite to the rotation direction of the second bracket inner gear 370. Thus, as shown in the drawings, the flat surfaces of the first bracket inner gear 320 and the second bracket inner gear 370 may be arranged in parallel with the longitudinal centerlines of the bracket center 330 and bracket center 360. The flat surfaces of the first bracket inner gear 320 and the second bracket inner gear 370 may also be arranged perpendicular to the horizontal centerlines of the bracket center 330 and bracket center 360. As described above, the first bracket inner gear 320 and the second bracket inner gear 370 may be connected to a position biased to a right edge or a left edge. The position may be spaced apart from the center of the bracket center 330 and bracket center 360 through the first main gear 341 and the second main gear 342. During rotation, as shown in FIG. 10, the virtual rotation axes RX1 and RX2 may be located at a predetermined height upward from the surfaces of the first support member 210 and the second support member 220 or at a predetermined height upward from the back surface of the display module 100. The virtual rotation axes RX1 and RX2 may also be at a predetermined height upward from the upper surface of the display module 100 or at a predetermined height upward with respect to the horizontal centerlines of the bracket center 330 and bracket center 360. Alternatively, the virtual rotation axes RX1 and RX2 may be formed above the bottom surface or lowermost surface of the display module 100 when viewed from the top to the bottom in the drawing.

The shape and size of the internal gears 321 and 371 of the first bracket inner gear 320 and the second bracket inner gear 370 may be adjusted. The adjustment may be to change a position at which the first bracket inner gear 320 and the second bracket inner gear 370 should be located in parallel with the bracket center 330 and bracket center 360. Additionally, the adjustment may be to change a position at which the first bracket inner gear 320 and the second bracket inner gear 370 should be located, such as at an angle of 90° with respect to the bracket center 330 and bracket center 360.

In the foldable display device 1, the maximum rotation width of the bracket inner gears 320 and 370 may be limited by the shape of the internal gear. Alternatively, the bracket inner gears 320 and 370 may be limited to be rotated within a range of 90° or less with respect to the horizontal centerline of the bracket center 330 and bracket center 360. A gap with a predetermined size may be formed between the bracket inner gears 320 and 370. The gap may be formed when the first support member 210 and the second support member 220 are folded to face each other. The bracket inner gears 320 and 370 are disposed biased to the each of left and right sides of the bracket center 330 and bracket center 360. Such a gap may allow the degree of bending of the central region of the display module 100 to be kept constant. For example, the central region of the display module 100 may be bent in a "U" shape in a state where the first support member 210 and second support member 220 are folded. As the display module 100 is bent in a "U" shape, stress points, or inflection points, occurring in the central region of the display module 100 are less than those in other shapes. Therefore, the display module 100 may be less stressed. Accordingly, the foldable display device 1 of the present disclosure may have a longer lifetime.

Figure 11:
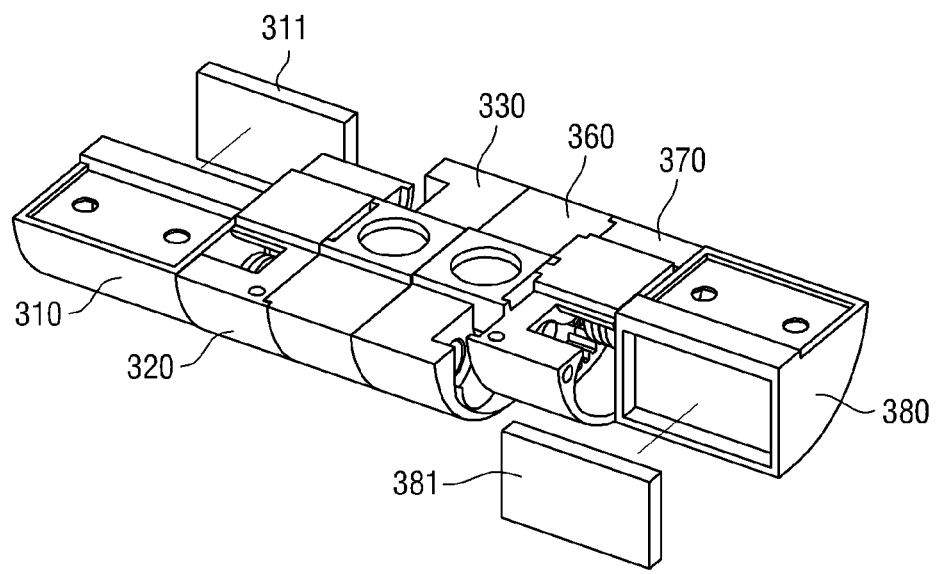
FIG. 11 is a view showing an example of a structure of arranging magnet members of a hinge of a foldable display device according to an embodiment.
Figure 11:
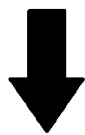
Figure 11:
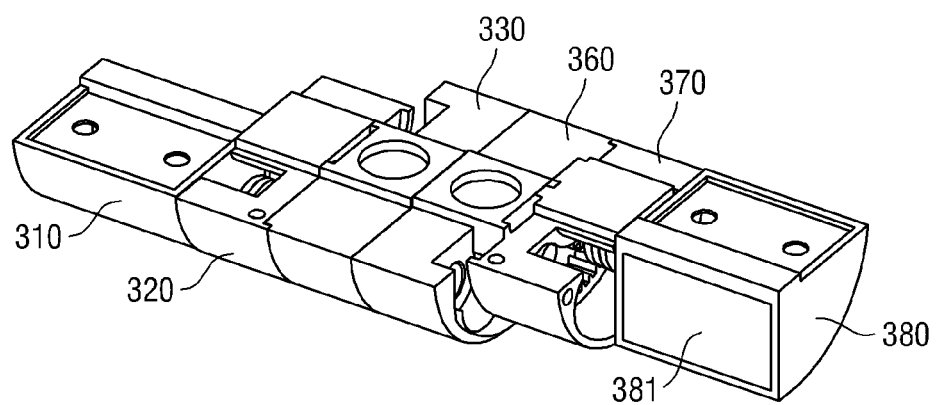

FIG. 11 is a view showing an example of a structure of arranging magnet members of a hinge of a foldable display device according to an embodiment.

Referring to FIG. 11, as described above, the hinge 300 includes the first bracket housing 310, the first bracket inner gear 320, the first bracket center 330, the second bracket center 360, the second bracket inner gear 370, and the second bracket housing 380. Main gears and shaft gears may be disposed to penetrate the bracket center 330 and bracket center 360 for rotation of the first bracket inner gear 320 and the second bracket inner gear 370.

A first magnet member 311 may be disposed on one side of the first bracket housing 310. For example, based on the drawings, the first magnet member 311 may be disposed on the side portion at which the curved portion is not formed. The curved portion may not be formed in a state where a surface on which coupling holes coupled to the second housing 120 of the first bracket housing 310 are arranged is disposed upward. The side portion may include a mounting groove with a predetermined depth such that the first magnet member 311 may be seated and fixed. The first magnet member 311 may be fitted (for example, forcibly fitted) into the groove of the side portion or may be fixed to the groove of the side portion through a separately adhesive member.

A second magnet member 381 may be disposed on one side of the second bracket housing 380. For example, based on the drawings, the second magnet member 381 may be disposed on the side portion at which the curved portion is not formed. The curved portion may not be formed in a state where a surface on which coupling holes coupled to the first bracket housing 310 of the second bracket housing 380 are arranged is disposed upward. The side portion may include a mounting groove with a predetermined depth such that the second magnet member 381 may be seated and fixed. The aforementioned second magnet member 381 may be fitted (for example, forcibly fitted) into the groove of the side portion or may be fixed to the groove of the side portion through a separately adhesive member.

Figure 12:
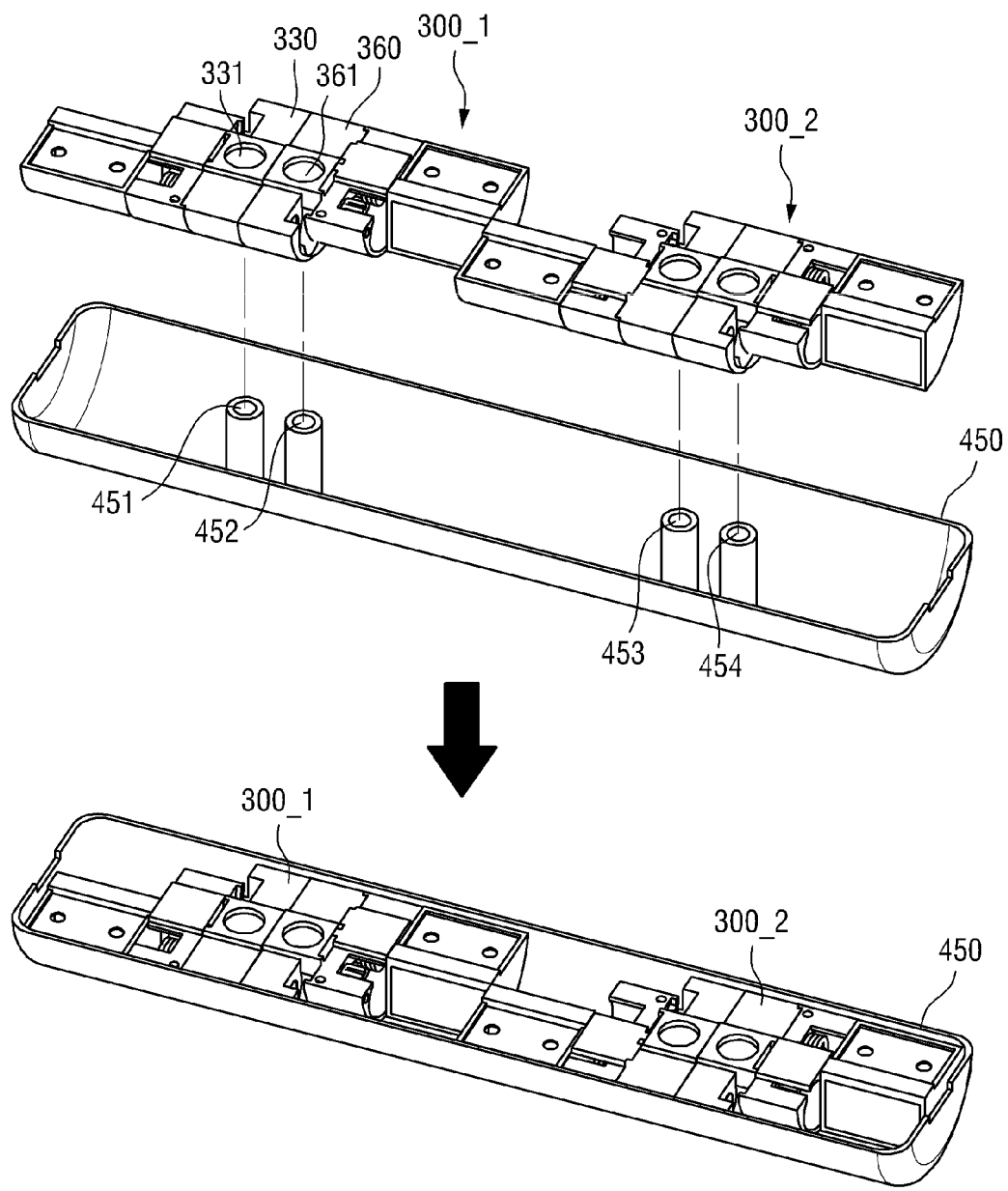
FIG. 12 is a view showing an example of a coupling of a hinge and a hinged case of a foldable display device according to an embodiment.

FIG. 12 is a view showing an example of a coupling of a hinge and a hinged case of a foldable display device according to an embodiment.

Referring to FIG. 12, the foldable display device 1 may include a first hinge structure 300_1 and a second hinge structure 300_2. The present disclosure is not limited thereto. For example, the foldable display device 1 may employ one hinge structure or employ three or more hinge structures. For example, the number of hinge structures may be designed to increase or decrease in correspondence with the size of the foldable display device 1.

In the first hinge structure 300_1, the first bracket center 330 may be provided with a first through hole 331 penetrating from the center of the flat surface to the bottom surface. A first boss 451 provided in the hinge cover 400 may be inserted into the first through hole 331.

In the first hinge structure 300_1, the second bracket center 360 may be provided with a second through hole 361 penetrating from the center of the flat surface to the bottom surface. A second boss 452 provided in the hinge cover 400 may be inserted into the second through hole 361.

The hinge cover 400 may include a housing body, and a first boss 451, a second boss 452, a third boss 453, and a fourth boss 454 which are disposed inside the housing body. In the housing body, for example, the left and right edges thereof are blocked, the upper side thereof is opened upward, and the inner side thereof is empty. Thus the longitudinal axis cross-section may have a semi-elliptical shape. The aforementioned curved portion of the hinge 300 may be disposed to face the inner side surface of the housing body.

The first boss 451 and the second boss 452 may be disposed on one side of the housing body that can be coupled with a first through hole 331. The first through hole 331 may be provided in the first bracket center 330 of the hinge 300 and a second through hole provided in the second bracket center 360.

The second hinge structure 300_2 may be provided in substantially the same shape as the first hinge structure 300_1. When bracket centers included in the second hinge structure 300_2 are seated on the hinge cover 400, the through holes formed in the bracket centers may be coupled to the third boss 453 and the fourth boss 454 of the hinge cover 400.

In the above description, the structure of the hinge cover 400 in which two hinge structures are disposed has been described, but the present disclosure is not limited thereto. For example, one hinge structure may be disposed in the hinge cover 400, or three or more hinge structures may be disposed in the hinge cover 400. As described above, the number of hinge structures may increase or decrease depending on the size of the foldable display device 1.

Figure 13:
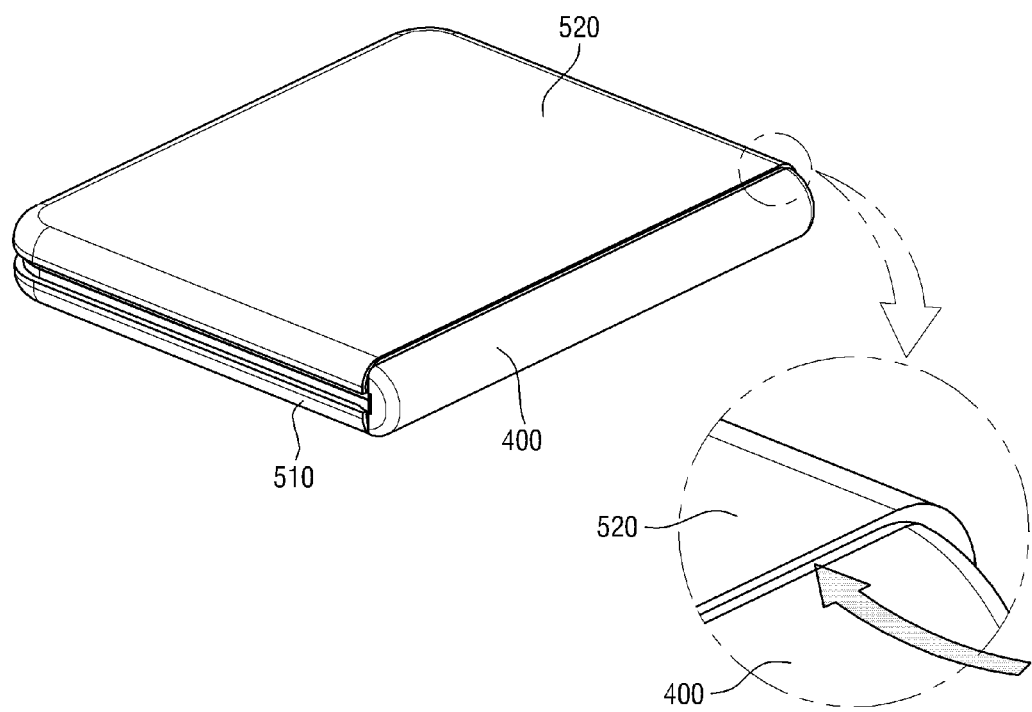
FIG. 13 is a perspective view showing a folded state of a foldable display device according to an embodiment.

FIG. 13 is a perspective view showing a folded state of a foldable display device according to an embodiment.

Referring to FIGS. 4 and 13, at least a part of the hinge cover 400 may be exposed when the first back cover 510 and the second back cover 520 are folded.

The foldable display device 1 may be designed to form a gap with a predetermined distance or more between the first back cover 510 and second back cover 520 to prevent the friction between the first back cover 510 and the second back cover 520 during the folding operation of the foldable display device 1 by hinge 300. For example, the gap between the first back cover 510 and second back cover 520 and the hinge cover 400 may be about 0.33 mm to about 0.4 mm.

In the display module 100, it may be problematic when foreign matter flows into the foldable display device 1 in the direction of the arrow shown in the drawing through the space around the hinge. Foreign matter can be described as dust or sand, but is not limited thereto.

Specifically, as shown in FIGS. 14 and 15, the display module 100 may include regions W1 and W2 that are not in contact with the first support member 210 and the second support member 220 to reduce bending stress in the folding area FA. Thus, when the display module 100 is folded, a part of the lower surface of the display module 100 may be exposed to the outside.

In this case, when foreign matter smaller than the gap formed between the first back cover 510 and second back cover 520 and the hinge cover 400 is introduced, the foreign matter may be placed between the lower surface of the display module 100 and the upper surfaces of the first support member 210 and second support member 220.

Then, when the display module 100 is unfolded again, the foreign matter placed between the lower surface of the display module 100 and the upper surfaces of the first support member 210 and second support member 220 may cause the surface of the display module 100 to streak due to the volume thereof. Thus the streak is viewed by the user's naked eye, thereby deteriorating the quality and reliability of the foldable display device 1.

According to the present disclosure, to solve the above problem, dust caps may be provided on the upper surface of the hinge cover 400. Additionally, a protrusion may be provided on one inner side surface of the first back cover 510 and second back cover 520. Hereinafter, the dust caps and the protrusion will be described in detail with reference to FIGS. 14 to 18. In FIGS. 14 to 18, the hinge 300 is omitted for convenience of explanation.

FIG. 14 is a cross-sectional view of a foldable display device taken along the line I-I' of FIG. 4 according to an embodiment.

Referring to FIGS. 4 and 14, the foldable display device 1 may include a first support member 210 and a second support member 220, a display module 100, a hinge 300, a hinge cover 400, a first back cover 510, and a second back cover 520. The first support member 210 and a second support member 220 are separated from each other. The display module 100 may be disposed on the first support member 210 and the second support member 220. The hinge may couple one side of the first support member 210 and one side of the second support member 220. The hinge cover 400 may be disposed to cover the hinge 300. The first back cover 510 may be disposed under the first support member 210. Lastly, the second back cover 520 may be disposed under the second back cover 520.

An adhesive layer (not shown) may be further disposed between the display module 100 and the first support member 210 and second support member 220. For example, the adhesive layer may be a double-sided adhesive film. The adhesive layer may not be disposed on the folding area FA.

According to an embodiment, the first region W1 shown in FIG. 14 and the second region W2 shown in FIG. 15B may be disposed to overlap the folding area FA in the thickness direction. The first region W1 indicates a region not attached to the first support member 210 and the second support member 220 when the display module 100 is unfolded. The second region W2 indicates a region not attached to the first support member 210 and the second support member 220 when the display module 100 is folded.

The hinge 300 may be coupled to one side of the first support member 210 and one side of the second support member 220, which face each other in the first direction DR1. As described above, the hinge 300 may be coupled to the first support member 210 and the second support member 220 through screw coupling and magnet coupling. The hinge 300 may be seated and fixed to the hinge cover 400.

Thus, a foldable display device may include a display module 100 disposed on a first support member 210 and a second support member 220; a hinge 300 coupling the first support member 210 to the second support member 220; a first back cover 510 disposed on the first support member 210 and comprising a first protrusion 511; a second back cover 520 disposed on the second support member 220 and comprising a second protrusion 521; and a hinge cover 400 comprising one or more dust caps (e.g., dust caps 410 and 420), wherein the one or more dust caps 410 and 420 contact the first protrusion 511 and the second protrusion 521 when the display module is folded, and do not contact the first protrusion 511 and the second protrusion 521 when the display module 100 is unfolded.

In some embodiments, the one or more dust caps 410 and 420, the first protrusion 511 and the second protrusion 521 each comprise a beveled edge, and wherein the beveled edge of the one or more dust caps 410 and 420 contacts the beveled edge of the first protrusion 511 and the beveled edge of the second protrusion 521 when the display module is folded. In some embodiments, the hinge cover 400 comprises a groove GV, wherein at least a portion of the first protrusion 511 and at least a portion the second protrusion 521 are within the groove when the display module 100 is unfolded.

The contact of the one or more dust caps 410 and 420 with the first protrusion 511 and the second protrusion 521 may be sufficient to prevent foreign particles from entering the foldable display device when folded, and contact between the first protrusion 511 and the second protrusion 521 with a central portion (and, in some cases, a groove) of the hinge cover 400 may prevent foreign particles from entering the foldable display device when unfolded or partially folded.

Figure 17:
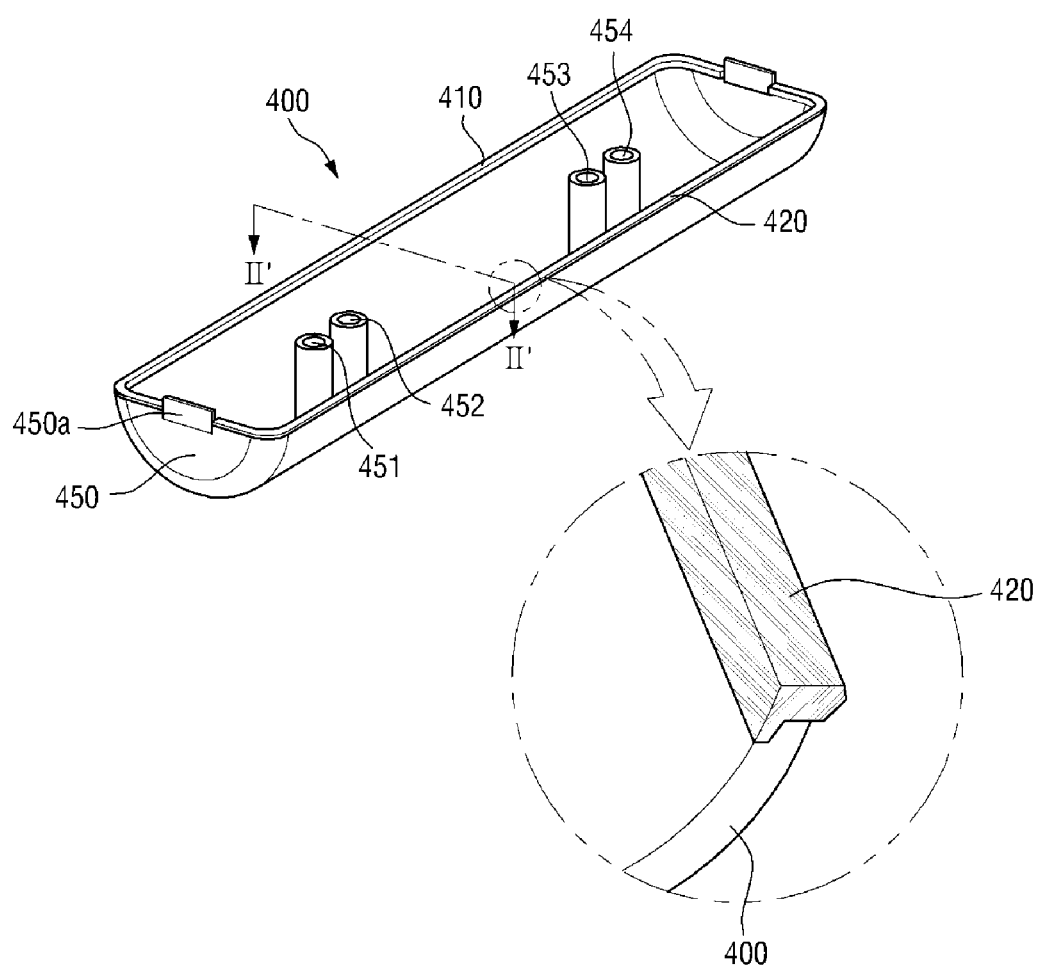
FIG. 17 is a perspective view showing a hinged cover of a foldable display device according to an embodiment.

FIG. 17 is a perspective view showing a hinged cover of a foldable display device according to an embodiment.

As shown in FIG. 17, the hinge cover 400 may include dust caps 410 and 420 on the upper surface thereof. Although shown in FIG. 17 that the dust caps 410 and 420 are disposed at each of the left side and right side of a cover film 450a formed on the side surface 450 of the hinge cover 400 to be spaced apart from each other. The present disclosure is not limited thereto, and the dust caps 410 and 420 may be formed integrally.

The cover film 450a may have a width longer than a gap formed between the first support member 210 and the second support member 220 when the first support member 210 and the second support member 220 is folded. The height of the cover film 450a may be a height that may cover a region where the display module 100 is exposed through a gap of a region where the first support member 210 and the second support member 220 face each other when the display module placed on the first support member 210 and the second support member 220 is folded.

The dust caps 410 and 420 may be made of a material different from that of the hinge cover 400. For example, the dust caps 410 and 420 may be made of an elastic material such as silicone and rubber to prevent foreign matter from flowing between the display module 100 and the first support member 210 and second support member 220. Thus, even when the gap between the inner surfaces of the first back cover 510 and the second back cover 520 and the dust caps 410 and 420 is not large, the folding operation by the hinge 300 can be performed easily.

Meanwhile, the hinge cover 400 may be made of a rigid material such as a metal, plastic, or glass to accommodate and protect the hinge 300 and to design the appearance of the foldable display device 1.

According to an embodiment, the hinge cover 400 may be insert-injected into a base material (for example, dust caps 410 and 420) made of an elastic material such as silicone or rubber. For example, the upper edge of the hinge cover 400 may be surrounded by the dust caps 410 and 420. The upper surface of the hinge cover 400 may include a protruding region with a different height to secure a fixing force with the dust caps 410 and 420 at the time of insert injection.

Referring to FIG. 14 again, the upper surfaces of the dust caps 410 and 420 may be disposed to be in contact with the lower surface of the first support member 210 and the lower surface of the second support member 220 when the display module is unfolded. Thus, even when the display module 100 is unfolded, it is possible to prevent the inflow of foreign matter from the outside.

The outer side surfaces of the dust caps 410 and 420 may include a reverse inclined surface (410_dg in FIG. 16) and a forward inclined surface. For example, one end of the reverse inclined surface and one end of the forward inclined surface are connected to each other.

For example, the cross-sectional shape of the outer surface of each of the dust caps 410 and 420 may include a vertex (the outermost point of the outer side surface). The distance between the outer side surface of each of the dust caps 410 and 420 and the inner side surface of each of the first back cover 510 and second back cover 520 may decreases from the bottom of each of the dust caps 410 and 420 to the outermost point thereof, and increase again from the outermost point of each of the dust caps 410 and 420 to the top thereof.

However, the shape of each of the dust caps 410 and 420 is not limited thereto, and the outer surface thereof may include a reverse inclined surface.

Each of the first support member 210 and second support member 220 may include each of lower structures 211 and 221 for accommodating a printed circuit board and a battery. Although not shown, the lower structures 211 and 221 may have a plate shape including a plurality of hollow cavities in a plan view.

A printed circuit board (not shown) may be provided with various electronic elements used to drive the foldable display device 1. For example, the printed circuit board may be provided with at least one processor, a memory, a communication circuit, an antenna, a microphone, a speaker, a camera, and the like. The battery may supply power for driving the foldable display device 1. The battery (not shown) may supply power to the printed circuit board disposed between the first support member 210 and the first back cover 510 through wiring provided at one side of the hinge cover 400.

Each of the lower structures 211 and 221 of the first support member 210 and second support member 220 may include each of coupling members 212 and 222. Each of the coupling members 212 and 222 may be connected with each of the coupling members 512 and 522 included in the first back cover 510 and second back cover 520. For example, the coupling members 512 and 522 may be bolts and nuts or screws.

Figure 18:
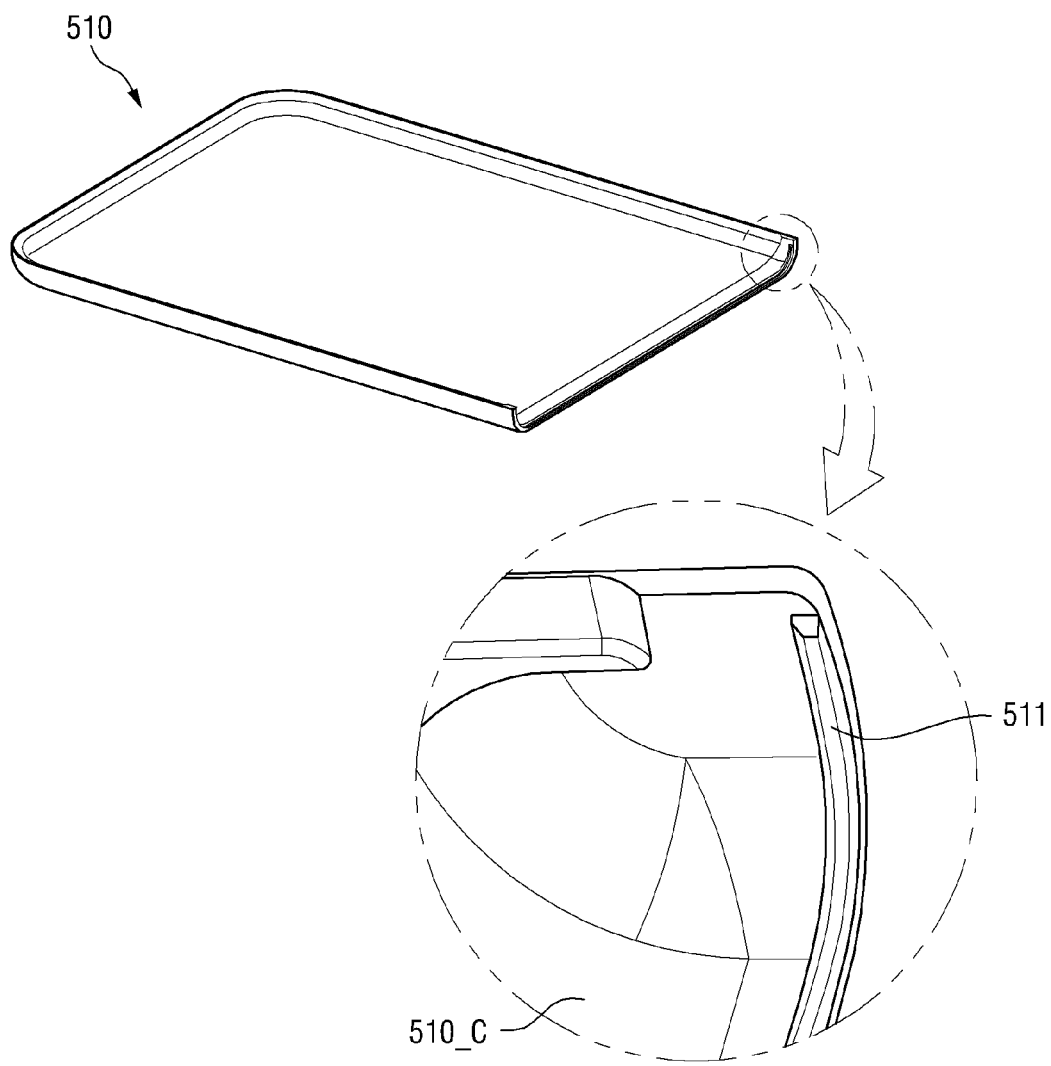
FIG. 18 is a perspective view showing a back cover of a foldable display device according to an embodiment.

FIG. 18 is a perspective view showing a back cover of a foldable display device according to an embodiment.

Referring to FIGS. 14 and 18, the first back cover 510 may be disposed on the back surface of the first support member 210 to cover the first support member 210. The first back cover 510 may be disposed to cover a part of the hinge cover 400 (for example, an upper end of a lower surface of the hinge cover) disposed between the first support member 210 and the second support member 220. The first back cover 510 may have rounded corners. The first back cover 510 may have an empty inside or may form an empty space between the first back cover 510 and the first support member 210 while being fastened to the first support member 210. For example, the first back cover 510 may have a structure in which a rectangular bottom surface 510_b and three side walls 510_s1, 510_s2, and 510_s3 extending from the bottom surface are formed. For example, one side of the first back cover 510 may be open without sidewalls.

The first back cover 510 may include a first protrusion 511 on the bottom surface 510_b with no sidewall. The first protrusion 511 may be formed along an entire side of the bottom surface 510_b with no sidewall. For example, as shown in FIG. 18, the first protrusion 511 may extend on the bottom surface 510_s1 along the second direction DR2 and may extend on the two sidewalls 510_s2 and 510_s2 along the third direction DR3.

The inner side surface of the bottom surface 510_b with no sidewall may include a first round portion 510_c formed to surround the hinge cover 400. For example, the upper surface of the first round portion 510_c of the first back cover 510 may have a curved shape substantially the same as the shape of the lower surface of the hinge cover 400.

The first protrusion 511 may be formed at one end of the first round portion 510_c. The inner side surface of the first protrusion 511 may include a vertical surface and an inclined surface (511_dg in FIG. 16).

For example, the vertical surface formed on the inner side surface of the first protrusion 511 may extend from the upper surface of the first round portion 510_c to the inclined surface. The inclined surface may extend to the upper surface of the first protrusion 511. In this case, the inclined surface may be in contact with the reverse inclined surfaces of the dust caps 410 and 420 during folding.

The outer side surface of the first protrusion 511 may include a vertical surface. For example, the vertical surface formed on the outer side surface of the first protrusion 511 may extend from the lower surface of the first back cover 510 to the upper surface of the first protrusion 511. In this case, this vertical surface may be disposed to face the vertical surface formed on the outer side surface of the second protrusion 521 during unfolding.

According to an embodiment, the first protrusion 511 may be integrally formed of the same material as the first back cover 510. The first back cover 510 may be made of a rigid material such as a metal, plastic, or glass to accommodate and protect electronic elements such as a printed circuit board, a battery, and the like and to design the appearance of the foldable display device 1.

Since the second back cover 520 has the same structure as the first back cover 510, a detailed description thereof will be omitted.

Referring to FIG. 14 again, the upper surface of the first round portion 510_c and the upper surface of the second round portion 520_c may be spaced apart from the lower surface of the hinge cover 400 by a first distance d1 when the display module 100 is unfolded.

The first protrusion 511 may be disposed at one end of the first round portion 510_c. The second protrusion 521 may be disposed at the one end of the second round portion 520_c adjacent to the one end of the first round portion 510_c. The upper surface of the first protrusion 511 and the upper surface of the second protrusion 521 may be spaced apart from the lower surface of the hinge cover 400 by a second distance d2. The second distance d2 may be smaller than the first distance d1.

Thus, it is possible to effectively prevent foreign matter from flowing into a gap between the hinge cover 400 and the first back cover 510 and second back cover 520 when the display module 100 is unfolded.

Figure 16:
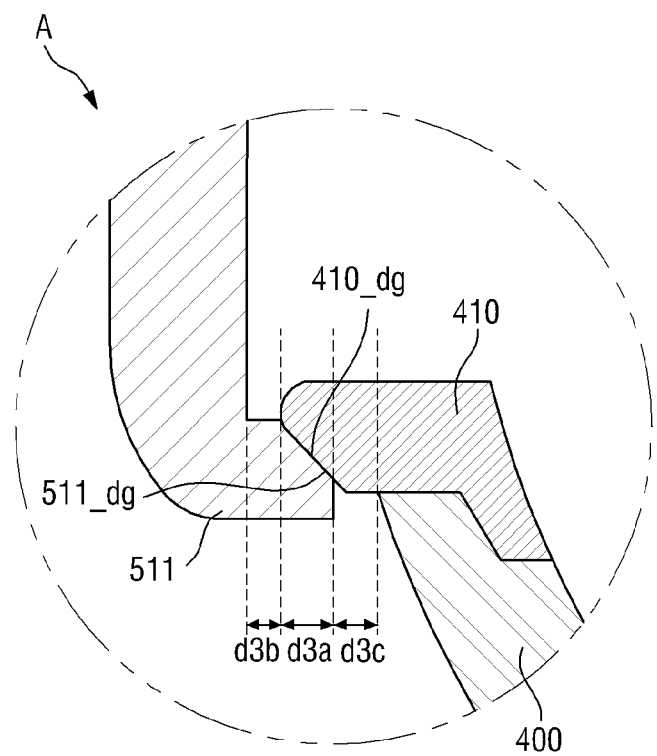
FIG. 16 is an enlarged view of area A in FIG. 15B.

FIGS. 15A and 15B are perspective views showing a folded state of a foldable display device according to an embodiment, and FIG. 16 is an enlarged view of area A in FIG. 15B.

Referring to FIGS. 14 to 16, in the foldable display device 1, when the display module 100 starts to be folded by an external force, the upper surface of the first round portion 510_c and the upper surface of the second round portion 520_c may be spaced apart from the lower surface of the hinge cover 400 by a third distance d1'. The first protrusion 511 and second protrusion 521 may be spaced apart from the lower surface of the hinge cover 400 by a fourth distance d2'.

According to an embodiment, the first distance d1 may be equal to the third distance d1', but the fourth distance d2' may be larger than the second distance d2. For example, since the lower surface of the hinge cover 400 and the gap opens and operates when the hinge starts to be folded, the folding operation may be easily performed even when the gap between the first protrusion 511 and second protrusion 521 and the lower surface of the hinge cover 400 is smaller than the gap between the upper surface of the first round portion 510_c and second round portion 520_c and the lower surface of the hinge cover 400.

In the foldable display device 1, when the folding of the display module 100 is completed by an external force, each of one side surfaces of the first dust cap 410 and second dust cap 420 of the hinge cover 400 may be disposed to overlap each of one side surfaces of the first protrusion 511 and second protrusion 521 of the first back cover 510 and second back cover 520 in the thickness direction (for example, the third direction DR3).

As shown in FIG. 16, the first protrusion 511 and the dust cap 410 may be disposed to overlap each other in at least a partial region when the foldable display device 1 is folded.

According to an embodiment, the inner side surface of the first protrusion 511 may include an inclined surface 511_dg. The outer side surface of the dust cap 410 may include a reverse inclined surface 410_dg. During the folding, the inclined surface 511_dg of the first protrusion and the reverse inclined surface 410_dg of the dust cap 410 may be in contact with each other. The inclined surface 511_dg of the first protrusion 511 and the reverse inclined surface 410_dg of the dust cap 410 may overlap each other in the thickness direction (for example, the third direction DR3) by a fifth distance d3a. Further, the length from the upper surface of the first round portion 510_c to one end of the inclined surface 511_dg may be a sixth distance d3b. The length from the outer side surface of the lower surface of the hinge cover 400 to the reverse inclined surface 410_dg may be a seventh length d3c.

However, the contact width between the inclined surface 511_dg of the first protrusion 511 and the reverse inclined surface 410_dg of the dust cap 410 is not limited thereto. For example, the contact width between the inclined surface 511_dg of the first protrusion 511 and the reverse inclined surface 410_dg of the dust cap 410 may be equal to the distance between the upper surface of the first round portion 510_c and the lower surface of the hinge cover 400.

Since the relationship between the second protrusion 521 and the dust cap 420 is the same as the relationship between the first protrusion 511 and the dust cap 410, a detailed description thereof will be omitted.

Hereinafter, other embodiments will be described. In the following embodiments, the same configuration as the aforementioned embodiment will be omitted or simplified, and differences will be mainly described.

Figure 19:
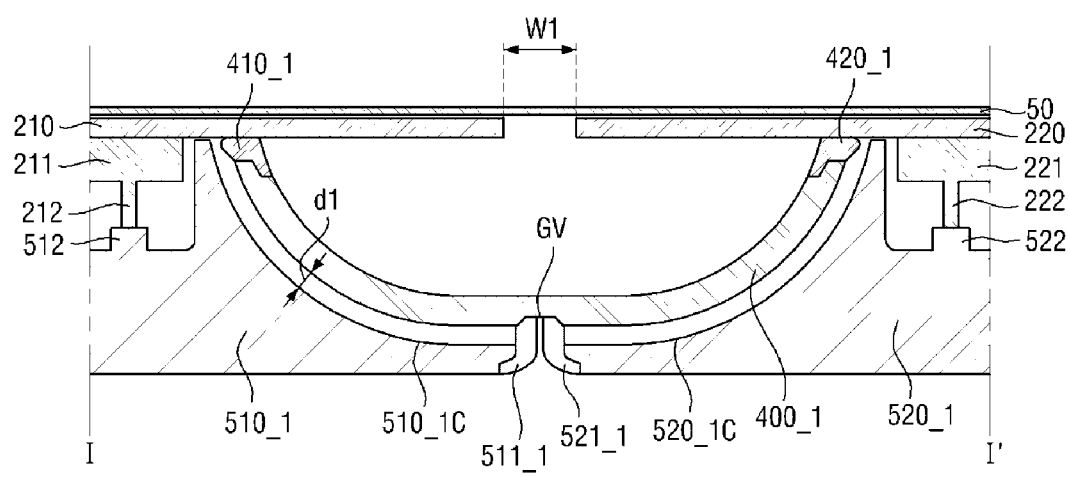
FIG. 19 is a cross-sectional view of a foldable display device taken along the line I-I' of FIG. 4 according to another embodiment.
Figure 20:
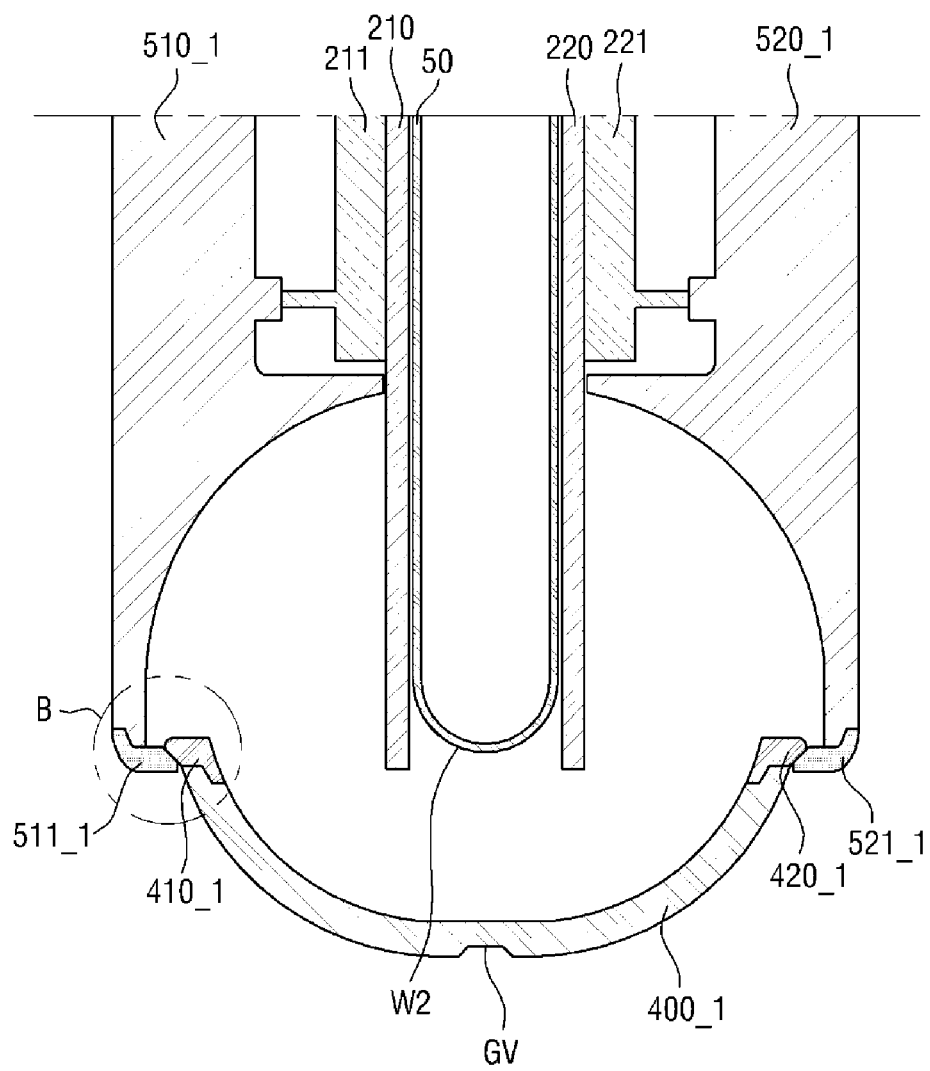
FIG. 20 is a perspective view showing a folded state of a foldable display device according to another embodiment.
Figure 21:
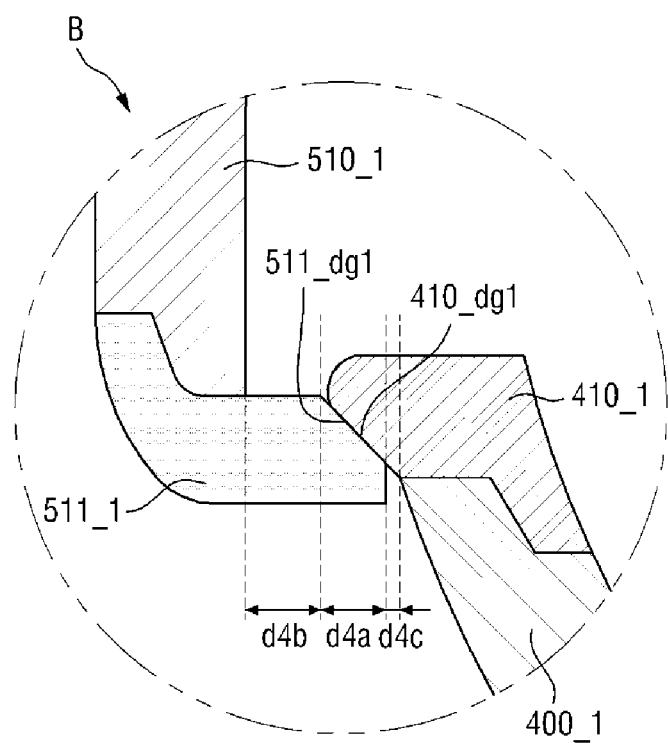
FIG. 21 is an enlarged view of area B in FIG. 20.

FIG. 19 is a cross-sectional view of a foldable display device taken along the line I-I' of FIG. 4 according to another embodiment, FIG. 20 is a perspective view showing a folded state of a foldable display device according to another embodiment, and FIG. 21 is an enlarged view of area B in FIG. 20. Even in FIGS. 19 and 21, the hinge 300 will be omitted for convenience of explanation.

Referring to FIGS. 4 and 19 to 21, the present embodiment is different from the embodiment shown in FIGS. 14 and 18 in that a groove GV is further provided in the lower surface of a hinge cover 400_1, that the distance from the outer side surface of the hinge cover 400_1 to the outermost points of first dust caps 410_1 and 420_1 decreases, and that first back cover 510_1 and second back cover 520_1 further includes second and third dust caps 511_1 and 521_1.

The foldable display device 1 may include a first support member 210 and a second support member 220, which are separated from each other, a display module disposed on the first support member 210 and the second support member 220, a hinge 300 coupling one side of the first support member 210 and one side of the second support member 220, a hinge cover 400_1 disposed to surround the hinge 300, a first back cover 510_1 disposed under the first support member 210, and a second back cover 520_1 disposed under the second support member 220.

An adhesive layer (not shown) may be further disposed between the display module 100 and the first support member 210 and second support member 220. For example, the adhesive layer may be a double-sided adhesive film. The adhesive layer may not be disposed on the folding area FA.

According to an embodiment, the first region W1 shown in FIG. 19 and the second region W2 shown in FIG. 20 may be disposed to overlap the folding area FA in the thickness direction. The first region W1 indicates a region not attached to the first support member 210 and the second support member 220 when the display module 100 is unfolded. The second region W2 indicates a region not attached to the first support member 210 and the second support member 220 when the display module 100 is folded.

The hinge 300 may be coupled to one side of the first support member 210 and one side of the second support member 220 which face each other in the first direction DR1. As described above, the hinge 300 may be coupled to the first support member 210 and the second support member 220 through screw coupling and magnet coupling. The hinge 300 may be seated and fixed to the hinge cover 400_1.

The hinge cover 400_1 may further include a groove GV on the lower surface thereof. The groove GV may be disposed on the lower surface of the hinge cover 400_1 to extend along the second direction DR2. For example, the groove GV may be disposed to overlap the upper surfaces of the second dust cap 511_1 and the third dust cap 521_1 to be described later in the thickness direction (third direction DR3). Although shown in FIG. 19 that the groove GV is integrally formed to be inserted when the second and third dust caps 511_1 and 521_1 are moved, the shape of the groove GV is not limited thereto. The groove GV may be separately formed so as to insert each of the second and third dust caps 511_1 and 521_1.

One surface of the groove GV may be disposed to be in contact with the upper surfaces of the second and third dust caps 511_1 and 521_1. Thus, it is possible to effectively prevent foreign matters such as dust and sand from flowing into the foldable display device 1 when the foldable display device 1 is unfolded.

The first dust caps 410_1 and 420_1 may be formed of a different material from the hinge cover 400_1. For example, the first dust caps 410_1 and 420_1 may be made of an elastic material such as silicone and rubber to prevent foreign matter from flowing between the display module 100 and the first support member 210 and second support member 220. Thus, the folding operation may be easily performed by the hinge 300 even when the gap between the inner side surfaces of the first back cover 510_1 and the second back cover 520_1 and the first dust caps 410_1 and 420_1 is not large.

Meanwhile, the hinge cover 400_1 may be made of a rigid material such as a metal, plastic, or glass to accommodate and protect the hinge 300 and to design the appearance of the foldable display device 1.

According to an embodiment, the hinge cover 400_1 may be insert-injected into a base material (for example, dust caps 410_1 and 420_1) made of an elastic material such as silicone or rubber. For example, the upper edge of the hinge cover 400_1 may be surrounded by the dust caps 410_1 and 420_1. The upper surface of the hinge cover 400_1 may include a protruding region with a different height to secure a fixing force with the dust caps 410_1 and 420_1 at the time of insert injection.

The upper surfaces of the dust caps 410_1 and 420_1 may be disposed to be in contact with the lower surface of the first support member 210 and the lower surface of the second support member 220, when the display module is unfolded. Thus, even when the display module 100 is unfolded, it is possible to prevent the inflow of foreign matter from the outside.

The outer side surfaces of the dust caps 410_1 and 420_1 may include a reverse inclined surface (410_1_$dg$ in FIG. 16) and a forward inclined surface. For example, one end of the reverse inclined surface and one end of the forward inclined surface are connected to each other.

For example, the cross-sectional shape of the outer surface of each of the dust caps 410_1 and 420_1 may include a vertex (the outermost point of the outer side surface). The distance between the outer side surface of each of the dust caps 410_1 and 420_1 and the inner side surface of each of the first back cover 510 and second back cover 520 may decrease from the bottom of each of the dust caps 410_1 and 420_1 to the outermost point thereof, and increase again from the outermost point of each of the dust caps 410_1 and 420_1 to the top thereof.

However, the shape of each of the dust caps 410_1 and 420_1 is not limited thereto, and the outer surface of each of the dust caps 410_1 and 420_1 may include a reverse inclined surface.

Each of the first support member 210 and second support member 220 may include each of lower structures 211 and 221 for accommodating a printed circuit board and a battery. Although not shown, the lower structures 211 and 221 may have a plate shape including a plurality of hollow cavities in a plan view.

Each of the lower structures 211 and 221 of the first support member 210 and second support member 220 may include each of coupling members 212 and 222. Each of the coupling members 212 and 222 may be connected with each of the coupling members 512 and 522 included in the first back cover 510 and second back cover 520. For example, the coupling members 512 and 522 may be bolts and nuts or screws.

Referring to FIGS. 4 and 19, the first back cover 510_1 may be disposed on the back surface of the first support member 210 to cover the first support member 210. The first back cover 510_1 may be disposed to cover a part of the hinge cover 400_1 (for example, an upper end of a lower surface of the hinge cover) disposed between the first support member 210 and the second support member 220. The first back cover 510_1 may have rounded corners. The first back cover 510_1 may have an empty inside or may form an empty space between the first back cover 510 and the first support member 210 while being fastened to the first support member 210. For example, the first back cover 510_1 may have a structure in which a rectangular bottom surface and three side walls extending from the bottom surface are formed. For example, one side of the first back cover 510_1 may be open without sidewalls.

The first back cover 510_1 may include a second dust cap 511_1 on the bottom surface 510_*b* with no sidewall. The second dust cap 511_1 may be formed along an entire side of the bottom surface with no sidewall. For example, the second dust cap 511_1 may extend on the bottom surface along the second direction DR2 and may extend on the two sidewalls along the third direction DR3.

The inner side surface of the bottom surface with no sidewall may include a first round portion 510_1*c* formed to surround the hinge cover 400_1. For example, the upper surface of the first round portion 510_1*c* of the first back cover 510_1 may have a curved shape substantially the same as the shape of the lower surface of the hinge cover 400_1.

The second dust cap 511_1 may be formed at one end of the first round portion 510_1*c*. The inner side surface of the second dust cap 511_1 may include a vertical surface and an inclined surface (511_*dg*1 in FIG. 16).

For example, the vertical surface formed on the inner side surface of the second dust cap 511_1 may extend from the upper surface of the first round portion 510_1*c* to the inclined surface. The inclined surface may extend to the upper surface of the second dust cap 511_1. In this case, the inclined surface may be in contact with the reverse inclined surfaces of the dust caps 410_1 and 420_1 during folding.

The outer side surface of the second dust cap 511_1 may include a vertical surface. For example, the vertical surface formed on the outer side surface of the second dust cap 511_1 may extend from the lower surface of the first back cover 510_1 to the upper surface of the second dust cap 511_1. In this case, this vertical surface may be disposed in parallel with the vertical surface formed on the outer side surface of the third dust cap 521_1 during unfolding.

According to an embodiment, the second and third dust caps 511_1 and 521_1 may be formed of a different material from the first back cover 510_1 and second back cover 520_1. For example, the second and third dust caps 511_1 and 521_1 may be made of an elastic material such as silicone and rubber to prevent foreign matter from flowing between the display module 100 and the first support member 210 and second support member 220. Thus, the folding operation may be easily performed by the hinge 300 even when the gap between the inner side surfaces of the first back cover 510_1 and the second back cover 520_1 and the second and third dust caps 511_1 and 521_1 is not large.

Meanwhile, the first back cover 510_1 and second back cover 520_1 may be made of a rigid material such as a metal, plastic, or glass to accommodate and protect electronic elements such as a printed circuit board and a battery and to design the appearance of the foldable display device 1.

According to an embodiment, the first back cover 510_1 and second back cover 520_1 may be insert-injected into a base material (for example, second and third dust caps 511_1 and 521_1 made of an elastic material such as silicone or rubber. For example, the edges of the first round portion 510_1*c* and second round portion 520_1*c* may be surrounded by the second and third dust caps 511_1 and 521_1.

The upper surfaces of the first round portion 510_1*c* and second round portion 520_1*c* may include a protruding region with a different height to secure a fixing force with the second and third dust caps 511_1 and 521_1 at the time of insert injection.

Since the second back cover 520_1 has the same structure as the first back cover 510_1, a detailed description thereof will be omitted.

The upper surface of the first round portion 510_1*c* and the upper surface of the second round portion 520_1*c* may be spaced apart from the lower surface of the hinge cover 400_1 by the first distance d1 when the display module 100 is unfolded.

The second dust cap 511_1 may be disposed at one end of the first round portion 510_1*c*. The third dust cap 521_1 may be disposed at one end of the second round portion 520_1*c* disposed adjacent to one end of the first round portion 510_1*c*. The upper surface of the second dust cap 511_1 and the upper surface of the third dust cap 521_1 may be disposed to be inserted into the groove GV of the hinge cover 400_1. For example, the upper surfaces of the second and third dust caps 511_1 and 521_1 and one surface of the groove GV of the hinge cover 400_1 may be disposed to be in contact with each other.

In the foldable display device 1, when the display module 100 starts to be folded by an external force, since the lower surface of the hinge cover 400_1 and the gap opens and operates, the folding operation may be easily performed even when the gap between the second and third dust caps 511_1 and 521_1 and the lower surface of the hinge cover 400_1 is smaller than the gap between the upper surfaces of the first round portion 510_1*c* and second round portion 520_1*c* and the lower surface of the hinge cover 400_1.

In the foldable display device 1, when the folding of the display module 100 is completed by an external force, each of the outer side surfaces of the first dust caps 410_1 and 420_1 of the hinge cover 400_1 may be disposed to overlap each of the inner side surfaces of the second and third dust caps 511_1 and 521_1 of the first back cover 510_1 and second back cover 520_1 in the thickness direction (for example, the third direction DR3).

As shown in FIG. 21, the second dust cap 511_1 and the first dust cap 410_1 may be disposed to overlap each other in at least a partial region when the foldable display device 1 is folded.

According to an embodiment, the inner side surface of the second dust cap 511_1 may include an inclined surface 511_*dg*1. Additionally, the outer side surface of the dust cap 410_1 may include a reverse inclined surface 410_*dg*1. During the folding, the inclined surface 511_*dg*1 of the first protrusion and the reverse inclined surface 410_*dg* of the dust cap 410_1 may be in contact with each other. The inclined surface 511_*dg*1 of the second dust cap 511_1 and the reverse inclined surface 410_*dg*1 of the dust cap 410_1 may overlap each other in the thickness direction (for example, the third direction DR3) by an eighth distance d4*a*. Further, the length from the upper surface of the first round portion 510_1*c* to one end of the inclined surface 511_*dg*1 may be a ninth distance d4*b*. Additionally, the length from the outer side surface of the lower surface of the hinge cover 400_1 to the reverse inclined surface 410_*dg*1 may be a tenth length d4*c*.

The ninth distance d4*b* from the upper surface of the first round portion 510_1*c* to one end of the inclined surface 511_*dg*1, shown in FIG. 21, may be longer than the sixth length d3*b* from the upper surface of the first round portion 510_*c* to one end of the inclined surface 511_*dg*, shown in FIG. 16. The tenth length d4c from the outer side surface of the lower surface of the hinge cover 400_1 to the reverse inclined surface 410_dg1, shown in FIG. 21 may be shorter than the seventh length d3c from the outer side surface of the lower surface of the hinge cover 400 to the reverse inclined surface 410_dg, shown in FIG. 16. For example, the length of the first dust cap 410_1 may decrease as the lengths of the second and third dust caps 511_1 and 521_1 increase.

Since the relationship between the third dust cap 521_1 and the first dust cap 420_1 is the same as the relationship between the second dust cap 511_1 and the first dust cap 410_1, a detailed description thereof will be omitted.

According to the embodiments of the present disclosure, there can be provided a foldable display device that can reduce a gap between a cover case and a hinged case using protrusions included in each of the cover case and the hinge case.

The effects of the present disclosure are not limited by the foregoing, and other various effects are anticipated herein.

Although the embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A foldable display device, comprising:
   a first support member and a second support member, which are separated from each other in a first direction;
   a display module disposed on the first support member and the second support member;
   a hinge extending in a second direction perpendicular to the first direction, and coupling one side of the first support member and one side of the second support member;
   a hinge cover surrounding the hinge on at least one side, wherein the hinge is disposed between the display module and the hinge cover in a third direction perpendicular to the first direction and the second direction;
   one or more dust caps disposed on at least one edge of the hinge cover;
   a first back cover disposed on the first support member in the third direction, wherein an edge of the first back cover extending parallel to the one side of the first support member in the second direction is separated from the first support member in the third direction, and wherein a first portion of the hinge and a first portion of the hinge cover are disposed between the first back cover and the display module when the display module is unfolded;
   a second back cover disposed on the second support member in the third direction, wherein an edge of the second back cover extending parallel to the one side of the second support member in the second direction is separated from the second support member in the third direction, and wherein a second portion of the hinge and a second portion of the hinge cover are disposed between the second back cover and the display module when the display module is unfolded;
   a first protrusion extending from the edge of the first back cover in a fourth direction opposite the third direction; and
   a second protrusion extending from the edge of the second back cover in the fourth direction,
   wherein the first protrusion and the second protrusion contact a middle portion of hinge cover when the display module is unfolded, and the first protrusion and the second protrusion contact the one or more dust caps when the display module is folded.

2. The foldable display device of claim 1, wherein the dust caps are made of a different material from the hinge cover.

3. The foldable display device of claim 2, wherein the dust caps are made of a rubber or silicone material, and the hinge cover is made of a metal material.

4. The foldable display device of claim 3, wherein an outer side surface of the dust caps overlaps an inner side surface of the first protrusion and an inner side surface of the second protrusion in a thickness direction when the display module is folded.

5. The foldable display device of claim 4, wherein each of the inner side surface of the first protrusion and the inner side surface of the second protrusion comprises an inclined surface, and the outer side surface of the dust caps comprise a reverse inclined surface contacting the inclined surface of each of the inner side surface of the first protrusion and the inner side surface of the second protrusion when the display module is folded.

6. The foldable display device of claim 5, wherein an upper surface of the dust caps are in contact with a lower surface of the first support member and a lower surface of the second support member when the display module is unfolded.

7. The foldable display device of claim 6, wherein the display module comprises a first region not contacting the first support member and the second support member when the display module is unfolded.

8. The foldable display device of claim 7, wherein one inner side surface of the first back cover comprises a first round portion surrounding the hinge cover, and one inner side surface of the second back cover comprises a second round portion surrounding the hinge cover.

9. The foldable display device of claim 8, wherein the upper surface of the first round portion and the upper surface of the second round portion are spaced apart from the lower surface of the hinge cover by a first distance when the display module is unfolded.

10. The foldable display device of claim 9, wherein the first protrusion is disposed at one end of the first round portion, and the second protrusion is disposed at one end of the second round portion adjacent to the one end of the first round portion.

11. The foldable display device of claim 10, wherein the upper surface of the first protrusion and the upper surface of the second protrusion are spaced apart from the lower surface of the hinge cover by a second distance.

12. The foldable display device of claim 11, wherein the second distance is shorter than the first distance.

13. The foldable display device of claim 12, wherein the display module comprises a second region not contacting the first support member and the second support member when the display module is folded.

14. A foldable display device, comprising:
   a first support member and a second support member, which are separated from each other;
   a display module disposed on the first support member and the second support member;
   a hinge coupling one side of the first support member and one side of the second support member;
   a hinge cover surrounding the hinge and comprising a first dust cap on an upper edge thereof;
   a first back cover disposed under the first support member and comprising a second dust cap at one end thereof; and a second back cover disposed under the second support member and comprising a third dust cap at one end thereof, wherein the first dust cap is in contact with the second dust cap and the third dust cap when the display module is folded.

15. The foldable display device of claim 14, wherein the first dust cap is made of a different material from the hinge cover, and each of the second dust cap and the third dust cap are made of different materials from each of the first back cover and the second back cover.

16. The foldable display device of claim 15, wherein the first to third dust caps are made of a rubber or silicone material, and the first back cover and the second back cover are made of a metal material.

17. The foldable display device of claim 16, wherein an outer side surface of the first dust cap overlaps an inner side surface of the second dust cap and an inner side surface of the third dust cap in a thickness direction when the display module is folded.

18. The foldable display device of claim 17, wherein each of the inner side surface of the second dust cap and the inner side surface of the third dust cap comprises an inclined surface, and the outer side surface of the first dust cap comprises a reverse inclined surface contacting the inclined surface of each of the inner side surface of the second dust cap and the inner side surface of the third dust cap when the display module is folded.

19. The foldable display device of claim 18, wherein an upper surface of the first dust cap is in contact with a lower surface of the first support member and a lower surface of the second support member when the display module is unfolded.

20. The foldable display device of claim 19, wherein a lower surface of the hinge cover comprises a groove, and the second dust cap and the third dust cap are inserted into the groove when the display module is unfolded.

21. A foldable display device, comprising:
a display module disposed on a first support member and a second support member;
a hinge coupling the first support member to the second support member;
a first back cover disposed on the first support member and comprising a first protrusion;
a second back cover disposed on the second support member and comprising a second protrusion; and
a hinge cover comprising one or more dust caps;
wherein the one or more dust caps contact the first protrusion and the second protrusion when the display module is folded, and do not contact the first protrusion and the second protrusion when the display module is unfolded.

22. The foldable display device of claim 21, wherein:
the one or more dust caps, the first protrusion and the second protrusion each comprise a beveled edge, and wherein the beveled edge of the one or more dust caps contacts the beveled edge of the first protrusion and the beveled edge of the second protrusion when the display module is folded.

23. The foldable display device of claim 21, wherein:
the hinge cover comprises a groove, wherein at least a portion of the first protrusion and at least a portion the second protrusion are within the groove when the display module is unfolded.

* * * * *